(12) United States Patent
Ng et al.

(10) Patent No.: US 11,777,167 B2
(45) Date of Patent: *Oct. 3, 2023

(54) ELECTRICAL SYSTEM WITH THERMAL PROTECTION

(71) Applicant: Zoox, Inc., Foster City, CA (US)

(72) Inventors: Robert Alan Ng, Mountain View, CA (US); Moritz Boecker, Millbrae, CA (US); Kyle Matthew Foley, Half Moon Bay, CA (US); Jason Jaspreet Singh Haer, San Francisco, CA (US); David Sands, San Mateo, CA (US)

(73) Assignee: Zoox, Inc., Foster City, CA (US)

(*) Notice: Subject to any disclaimer, the term of this patent is extended or adjusted under 35 U.S.C. 154(b) by 292 days.

This patent is subject to a terminal disclaimer.

(21) Appl. No.: 17/181,809

(22) Filed: Feb. 22, 2021

(65) Prior Publication Data

US 2021/0175569 A1    Jun. 10, 2021

Related U.S. Application Data

(63) Continuation of application No. 16/212,251, filed on Dec. 6, 2018, now Pat. No. 10,985,352.

(51) Int. Cl.
*H01M 50/24* (2021.01)
*H01M 50/30* (2021.01)
(Continued)

(52) U.S. Cl.
CPC ......... *H01M 50/24* (2021.01); *H01M 50/213* (2021.01); *H01M 50/244* (2021.01);
(Continued)

(58) Field of Classification Search
CPC ..... H01M 50/24; H01M 50/30; H01M 50/543
See application file for complete search history.

(56) References Cited

U.S. PATENT DOCUMENTS

| 2,146,377 A | 2/1939 | MacCallum |
| 9,660,379 B1 | 5/2017 | Burkman |
| (Continued) | | |

FOREIGN PATENT DOCUMENTS

| KR | 2017047539 A | * | 5/2017 | .......... H01M 2/1016 |

OTHER PUBLICATIONS

Machine Translation of: KR-2017047539-A, Hong, May 8, 2017.*
(Continued)

*Primary Examiner* — Kenneth J Douyette
(74) *Attorney, Agent, or Firm* — Lee & Hayes, P.C.

(57) ABSTRACT

A battery pack for a vehicle electrical system includes a casing for receiving one or more battery modules. The battery modules are insertable into a casing of the battery pack by sliding couplers along pairs of rails and are securable to the ends of the rails. After insertion, the rails thermally insulate one battery module from other battery modules coupled to the casing. In some examples, a first stiffness or a first mechanical frequency of the casing with the one or more battery modules inserted may differ from a second stiffness or a second mechanical frequency associated with a body of a vehicle or another component associated therewith by a threshold amount. Additionally, the casing may be configured with vents for venting the hot gases, such as those generated by a battery module in a thermal runaway event.

20 Claims, 8 Drawing Sheets

(51) Int. Cl.
*H01M 50/51* (2021.01)
*H01M 50/249* (2021.01)
*H01M 50/282* (2021.01)
*H01M 50/244* (2021.01)
*H01M 50/213* (2021.01)
*H01M 50/264* (2021.01)
*H01M 50/308* (2021.01)
*H01M 50/317* (2021.01)

(52) U.S. Cl.
CPC ....... *H01M 50/249* (2021.01); *H01M 50/264* (2021.01); *H01M 50/282* (2021.01); *H01M 50/30* (2021.01); *H01M 50/308* (2021.01); *H01M 50/317* (2021.01); *H01M 50/51* (2021.01); *H01M 2220/20* (2013.01)

(56) References Cited

U.S. PATENT DOCUMENTS

| | | |
|---|---|---|
| 2013/0052514 A1 | 2/2013 | Kim |
| 2014/0017528 A1 | 1/2014 | Uehara et al. |
| 2014/0186664 A1 | 7/2014 | Park |
| 2014/0186693 A1* | 7/2014 | Tyler ................ H01M 10/6554 264/129 |
| 2016/0093849 A1 | 3/2016 | DeKeuster et al. |
| 2020/0185671 A1 | 6/2020 | Ng et al. |
| 2020/0185686 A1 | 6/2020 | Ng et al. |

OTHER PUBLICATIONS

Japanese Office Action dated Nov. 30, 2021 for Japanese Patent Application No. 2021-532052, a foreign counterpart to U.S. Pat. No. 10,985,352, 5 pages.

\* cited by examiner

ELECTRICAL SYSTEM WITH THERMAL PROTECTION

PRIORITY

This application is a continuation of and claims priority to U.S. patent application Ser. No. 16/212,251, filed on Dec. 6, 2018, now U.S. Pat. No. 10,985,352 the entire contents of which is incorporated herein by reference.

BACKGROUND

Many vehicles in operation today are powered, at least in part, by electrical systems. To provide sufficient electricity to power an entire vehicle, the electrical system typically includes batteries configured with multiple cells, each cell adding its voltage potential to a respective battery. Thus, an increase in a number of cells included in a battery directly results in an increase in an amount of power provided by the battery. However, the increase in the number of cells may additionally increase a risk of the battery overheating due to heat generated by a cell.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4A is perspective view of the battery module with a first terminal located on a first side wall of the battery module and a second terminal located on a second side wall of the battery module, the first terminal and the second terminal being located diagonally opposite one another. FIG. 4B is a close-up view of a cross-section of the battery module depicted in FIG. 4A, the close-up view depicting the coupler configured to secure the battery module into the battery pack and a plurality of cells located within the battery module.

FIG. 5A depicts a plurality of battery cells configured in rows. FIG. 5B is a top view of the plurality of battery cells electrically coupled to a first terminal and a second terminal.

DETAILED DESCRIPTION

Figure 1:
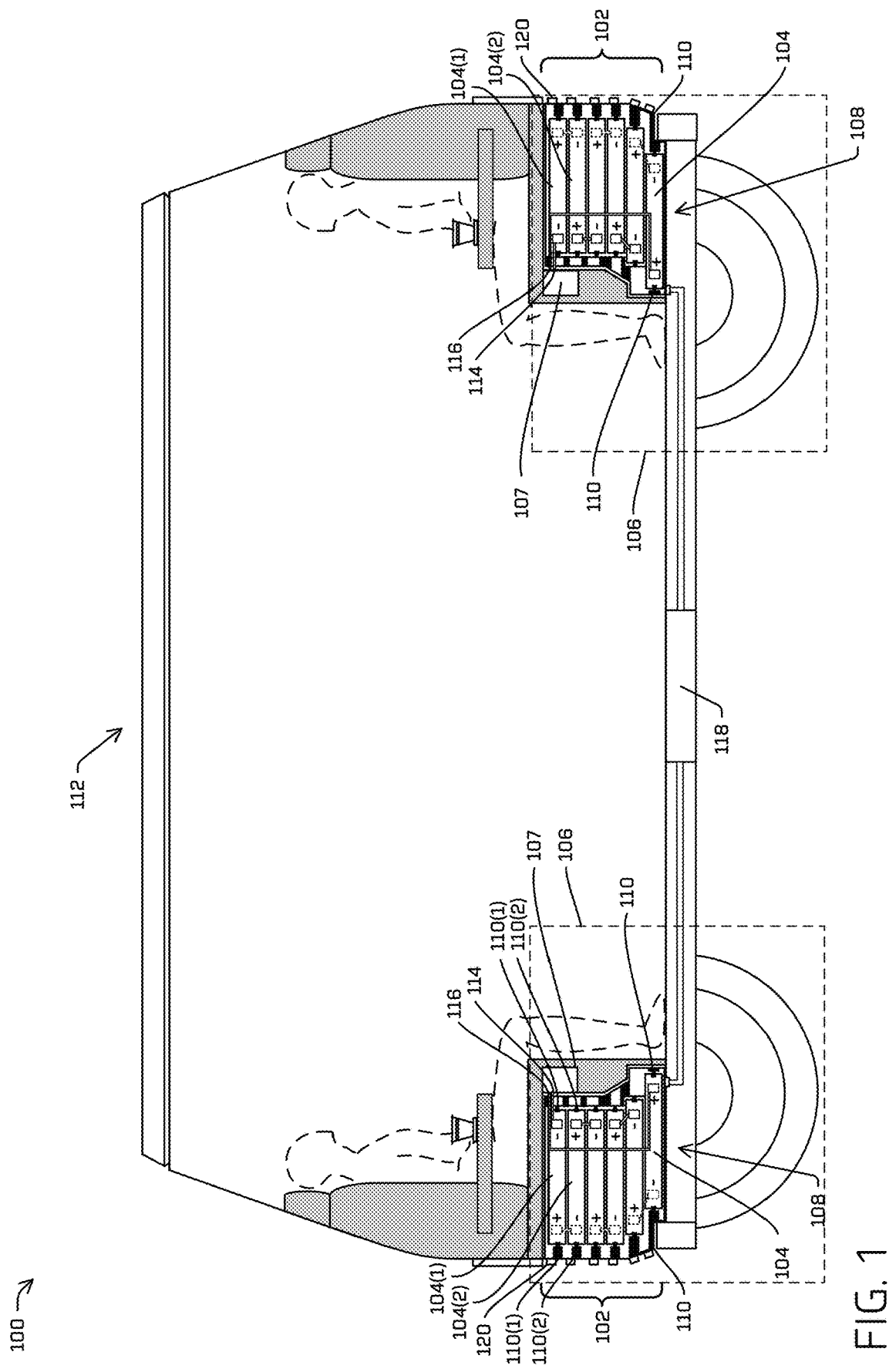
FIG. 1 is an illustration of an autonomous vehicle in which battery packs configured with thermal runaway mitigation systems may provide power to operating systems of the autonomous vehicle, in accordance with embodiments of the disclosure.

This disclosure is directed to techniques for improving thermal runaway mitigation for batteries, such as may be used in a vehicle electrical system. The vehicle described herein may include a vehicle that is powered in whole or in part by one or more batteries. Although primarily discussed in the context of powering an autonomous vehicle, the methods, apparatuses, and systems described herein may be applied to providing power to a variety of systems (e.g., a sensor system or a robotic platform), and are not limited to autonomous vehicles. In another example, the techniques may be utilized in an aviation or nautical context, as a distributed storage system, a battery backup system, or in any system powered by the one or more batteries.

A vehicle electrical system may include a plurality of batteries configured in one or more battery packs. In some examples, a battery pack may include batteries (e.g., battery modules, battery subsystems, etc.) configured substantially horizontally, such as in a side-by-side configuration. In at least one example, a battery pack may include multiple stacked batteries. The battery pack may include a casing configured to secure the batteries in place in the vehicle. The casing may be made of a metal material (e.g., aluminum, steel, titanium, etc.), a plastic material (e.g., polymer, etc.), a ceramic material, a composite material (e.g., fiberglass, carbon fiber, Kevlar, etc.), or a combination of the foregoing.

The battery pack may include multiple battery module bays, each battery module bay being configured to house a battery module. In various examples, each battery module bay may include a pair of rails configured on opposing sides of an interior surface of the casing. The pairs of rails may be configured to connect to couplers on opposing sides of a battery module (e.g., exterior surface of a battery housing). For example, a first coupler of a battery module may be configured to receive a first rail of a pair of rails and a second coupler of the battery module may be configured to receive a second rail of the pair of rails. To insert the battery into the battery pack (e.g., casing of the battery pack), the first coupler and the second coupler may slide along the first rail and the second rail, respectively. In some examples, each battery module bay may include a rail configured on an interior surface and a coupler on an opposing interior surface (e.g., opposite side wall). In such examples, a battery module may be configured with a rail disposed on one exterior side wall and a coupler disposed on an opposite exterior side wall. The couplers of the battery module and the casing may be configured to couple to the respective rails of the battery module and the casing. The battery may be secured into the casing via one or more fasteners (e.g., screws, rivets, pins, snap connectors, latches, spring-type fasteners, etc.) at an end of the rails.

In various examples, an insertion of the batteries into the battery pack may cause a stiffness of the battery pack to increase. The stiffness may influence a resonant (e.g., vibrational, modal, etc.) frequency of the battery pack, such as during vehicle operation. In some examples, after insertion of the batteries into the battery pack, the stiffness of the battery pack may be greater than a stiffness associated with the vehicle body and/or other components of the vehicle. In such examples, modal frequencies associated with the battery pack, the vehicle body, and/or components of the vehicle may substantially differ. For example, a modal frequency associated with the vehicle body may be 35 Hertz and a modal frequency associated with a battery pack with batteries inserted may be 45 Hertz. The difference between the stiffness of the vehicle and the stiffness of the battery pack (and consequent 10 Hertz difference in modal frequencies) may help prevent resonance and reduce vibration and noise experienced by a passenger in the vehicle.

In various examples, at least some of the battery module bays may include a space surrounding at least a portion of a battery module. The space may include an air gap between a top of a first module and a bottom side of a second module. The air gap may act as a barrier to heat transfer between the first and second modules. In some examples, the space may extend to a side portion of the respective battery module. The space may be bounded, at least in part, by the pairs of rails associated with the first and second modules (e.g., pairs of rails to which the first module and the second module are coupled). In various examples, the pairs of rails may be configured to substantially thermally insulate a first battery module bay from a second battery module bay. In such examples, the pairs of rails may provide a barrier configured to preclude hot gases produced by a battery module, such as in thermal runaway, from substantially affecting another battery module.

In various examples, the battery module may include a battery housing. The battery housing may include a cover, one or more sidewalls, and a base. The cover, the side wall(s), and/or the base may comprise a sheet of metal material, ceramic material, plastic material, composite material, or a combination thereof. Each of the cover, the side wall(s), and the base may be made of a same or different material from one another. In at least one example, the cover may comprise a sheet of stainless-steel material. In some examples, the cover, the side wall(s), and/or the base may include an insulating material (e.g., mica, silicone rubber, Teflon, etc.), which, when provided, may be laminated, glued, or otherwise affixed to the cover. In various examples, the cover, the side wall(s), and/or the base may be configured to substantially thermally insulate a respective battery module from another battery module situated adjacent (e.g., above or below) the respective battery module. In various examples, at least two of the side wall(s) of the battery housing may be configured with couplers configured to receive rails, such as those described above. In some examples, one side wall of the battery may be configured with a coupler to receive a rail, and an opposing side wall may be configured with a rail to couple to a coupler of the casing of the battery pack.

In various examples, the battery housing may enclose a plurality of cells. In various examples, the battery modules may be configured to vent gases, such as gases emitted from one or more of the plurality of cells. In such examples, the gases may vent out of the battery module via one or more battery module vents. In some examples, the gases may vent from an interior compartment of the battery module into the space surrounding at least the portion of the battery module. In various examples, each battery module bay of the battery pack may include one or more vents (e.g., casing vents) for venting gases outside of the casing. The casing vent(s) may be configured to substantially equalize pressure between the battery module bay (e.g., space containing gas) and an atmosphere outside the casing. In some examples, the casing vent(s) may comprise a breathable material (e.g., membrane) configured to filter contaminants from gases exiting the vent(s) and/or to prevent contaminants from entering the battery pack. In various examples, the casing vent(s) may be configured to be sealed during normal operation and to "blow out" (i.e., release pressure) such as when subjected to a threshold pressure differential between the battery module bay and the atmosphere outside the vehicle. The battery module vent(s) and the casing vent(s) may prevent a battery module from over-pressurizing and/or over-heating, such as in the case of a cell failure and/or thermal runaway.

In some examples, the plurality of cells may be configured in multiple rows of cells. In various examples, the cells in a row of cells may be in parallel. In some examples, the cells in a row of cells may be configured in series. In some examples, each cell in a roll of cells may be configured with a positive polarity on a first side of the battery module and a negative polarity on a second side of the battery module opposite the first side.

In various examples, the plurality of cells may be electrically coupled via one or more wires or bus bars. In various examples, a positive terminal associated with cells of a first row of cells may be connected to a bus bar situated between the first row of cells and a second row of cells. In such examples, a negative terminal associated with cells of the second row of cells may be connected to the bus bar. In various examples, the plurality of cells may be electrically coupled such that a most positive charge (e.g., positive terminal) is at a first end of a first side wall and a most negative charge (e.g., negative terminal) is at a second end of a second side wall, the first end and the second end being opposite ends of the side walls, and the first side wall and the second side wall being opposing side walls in the battery housing. In such examples, the positive terminal and the negative terminal of each battery module may be disposed at opposite corners. In various examples, the disposition of the positive terminal and the negative terminal at opposite corners of each battery module may substantially preclude a bridging event (e.g., arcing) between the two terminals, thereby enhancing safety of battery module use.

In various examples, the battery modules may be inserted into the battery pack (e.g., casing) such that every other battery module has a positive terminal and negative terminal aligned. For example, a first battery module may be inserted with a positive terminal situated at a left front corner of the battery pack and a second battery module adjacent to the first battery module may be inserted with a negative terminal situated at the left front corner of the battery pack. A third battery module adjacent to the second battery module may be inserted with a positive terminal situated at the left front corner of the battery pack, etc.

In various examples, the battery modules in a battery pack may be configured in series. In such examples, a positive terminal of a first battery module may be electrically coupled to a negative terminal of a second battery module, a positive terminal of the second battery module may be electrically coupled to a negative terminal of a third battery module, and so on. In at least one example, a first positive bus bar may carry a most positive charge from a last battery module (e.g., a bottom battery module in a stack) to a high voltage junction box (e.g., junction box) configured to monitor voltage and/or current provided by the battery pack and a first negative bus bar may carry a most negative charge of the battery pack from a first battery module (e.g., a top battery module in a stack) to the high voltage junction box. The high voltage junction box may additionally be configured to allow power to flow to a drive module of the vehicle (e.g., a drive module associated with the battery pack) to operate the vehicle.

In various examples, a second positive bus bar and a second negative bus bar may additionally be electrically coupled to the high voltage junction box associated with the battery pack at a first end and a connector at a second end.

The second positive bus bar and the second negative bus bar may include high-voltage bus bars. In some examples, the connector may include a floating connector. In such examples, the connector may be configured to accommodate relative misalignment of plugs, such as that caused by vibration and/or other movement of the vehicle. In various examples, the connector may be configured to transfer power provided by the battery modules to a battery balance box, such as via one or more cables, wires, bus bars, or other electrical couplings. Additionally, the connector may be configured to receive power from the battery balance box, such as that received from a second set of battery modules situated in a second battery pack (e.g., of a second drive module). The battery balance box may be configured to maximize the capacity of each battery pack by modulating the charge and/or discharge of batteries based on the capacity associated therewith. In various examples, the second positive bus bar and the second negative bus bar may be configured to carry power from the high voltage junction box associated with the battery pack and/or carry power from the high voltage junction box associated with the battery pack, such as when the battery balance box determines that an unequal amount of power between two or more battery packs of a vehicle.

In various examples, the second positive bus bar and/or the second negative bus bar may be configured to de-energize in the event of a thermal runaway or other failure or malfunction of a battery module associated with the battery pack. In some examples, the second positive bus bar and/or the second negative bus bar may de-energize based at least in part on a drop and/or surge in voltage provided to the high voltage junction box by the first positive bus bar and the first negative bus bar. In some examples, the second positive bus bar and/or the second negative bus bar may be de-energized based on a drop and/or surge in voltage exceeding a threshold voltage, such as that indicative of a thermal runaway and/or failure of a battery module. In various examples, the high voltage junction box may detect the drop and/or surge in voltage and may de-energize one or both of the respective second bus bars. In some examples, the battery balance box may detect the drop and/or surge in voltage and may de-energize one or both of the respective second bus bars. For example, a third battery in a battery pack including six batteries may short circuit due to a failure of one or more cells corresponding to the third battery. The voltage provided by the battery pack may consequently drop resulting in a total voltage provided to drive module being less than an expected voltage (e.g. less than a voltage required to run the components of the drive module, less than a threshold voltage). Based on the voltage drop, the drive module and/or balance box may sense a failure in the battery pack and de-energize the second positive and/or second negative bus bars.

FIG. 1 is an illustration of an autonomous vehicle 100 in which battery packs 102 configured with thermal runaway mitigation systems may provide power to operating systems of the autonomous vehicle, in accordance with embodiments of the disclosure. In the illustrative example, the vehicle 100 includes two battery packs 102. In other examples, the vehicle 100 may include a greater or lesser number of battery packs 102.

The battery packs 102 may be configured with one or more battery modules 104 (e.g., batteries, battery subsystems, etc.). In the illustrative example, the battery packs include six battery modules 104 configured in a stack. In other examples, the battery packs 102 may include a greater or lesser number of battery modules 104. Additionally, in other examples, the battery module(s) 104 may be configured differently, such as substantially horizontally and/or substantially vertically, or in any other configuration.

In various examples, the battery module(s) 104 may be configured to provide power to a drive module 106 associated with the battery pack via a high voltage junction box 107. The drive module 106 may be configured to control operation of the various vehicle systems. For example, the drive module 106 may control steering, wheel speed, and/or other components of the powertrain and/or drivetrain of the vehicle 100, as well as HVAC, etc.

In various examples, the battery module(s) 104 may be securably coupled to a casing 108 of the battery pack 102. The casing 108 may include a metal material (e.g., aluminum, steel, titanium, etc.), a plastic material (e.g., polymer, etc.), a ceramic material, a composite material (e.g., fiberglass, carbon fiber, Kevlar, etc.), or a combination of the foregoing. In at least one example, the casing 108 may include a metal material, formed via an extrusion process. In various examples, the casing may include a base, a cover, and four side walls including a front side wall, a rear side wall, a right side wall and a left side wall (e.g., first side wall, second side wall, third side wall, fourth side wall). Although illustrated as a cross section, with one side of the casing 108 removed, the casing 108 of the battery pack 102 is configured to envelope the battery modules 104 on all sides. In various examples, the casing 108 of the battery pack 102 may be configured to be substantially water proof and/or water resistant.

In various examples, each battery module 104 may be configured to couple to a casing attachment mechanism. In some examples, the casing attachment mechanism may include rails 110. The rails 110 may include a metal material, a ceramic material, a composite material, a plastic material, or a combination of the foregoing. The rails 110 may include the same material or a different material as the casing 108. In some examples, the rails may be disposed on an internal surface of the front side wall (e.g., first side wall) and the rear side wall (e.g., second side wall) in a substantially horizontal configuration. In some examples, the rails 110 may extend from a first end, substantially situated at the right side wall (e.g., third side wall), to a second end, substantially situated at the left side wall (e.g., fourth side wall). In such examples, the rails 110 may substantially extend a length of the casing 108.

The rails 110 may be configured to connect to couplers on opposing sides of a battery module 104 (e.g., exterior surface of a battery housing). In various examples, the rails 110 may include a coating. The coating may include rubber, polyurethane, nylon, Teflon, silicone, polypropylene, polyethylene, or the like. In some examples, the coating may be configured to increase and/or decrease a frictional component between the rails 110 and the couplers of the battery modules 104. In some examples, the coating may be configured to assist in substantially thermally isolating heat one battery module from affecting another battery module 104. In such examples, the coating may assist in preventing gases, such as those emitted from a battery module 104 during thermal runaway, from passing through the coupler between the battery module 104 and the rails 110.

In the illustrative example, the rails 110 (e.g., casing attachment mechanisms, casing couplers, etc.) are configured in pairs of rails 110 disposed on opposite internal surfaces of the battery pack 102, each of the pairs of rails 110 connected to couplers (e.g., module couplers, module attachment mechanisms, etc.) on opposite sides of a battery module 104. In some examples, the casing attachment mechanism may include a casing coupler disposed on an internal surface opposite a rail 110. In such examples, a battery module 104 may be configured to couple to a casing coupler via a rail disposed on the battery module 104 on one side and a rail 110 of the battery pack 102 via a module coupler on the other side. In some examples, the opposing internal surfaces of the battery pack 102 may include alternating rails 110 and casing couplers. For example, a casing coupler may be disposed between two rails. In some examples, the opposing internal surfaces of the battery pack 102 may include casing couplers on a first internal surface and rails 110 on a second internal surface, the first internal surface and the second internal surface being opposite internal side walls.

In various examples, each rail 110 may be disposed at a substantially equal distance vertically from one another. In such examples, each battery module 104 may be spaced a substantially similar vertical distance from another battery module 104 inserted into the casing 108. For example, after insertion, such as via sliding the couplers of the battery module 104 along the rails 110, a bottom side of a first battery module 104(1) may be spaced a distance from a top side (e.g., cover) of a second battery module 104(2). The distance may provide an air gap configured to prevent direct thermal conduction between the first battery module 104(1) and the second battery module 104(2).

Additionally, after insertion, the battery module(s) 104 may be secured into the casing via one or more fasteners (e.g., screws, rivets, pins, snap connectors, latches, spring-type fasteners, etc.) at an end of the rails. In some examples, as will be discussed in more detail below with regard to FIG. 2, a battery module 104 may be secured into the casing 108 with a plate coupling to the battery module 104 and the end of each rail of a pair of rails 110. In such examples, each battery module 104 may be configured to be removed and replaced independently, such as by removing the respective fasteners and plates.

In various examples, an insertion of the battery module(s) 104 into the battery pack 102 may cause a stiffness of the battery pack 102 to increase. The stiffness may correspond to a vibrational frequency of the battery pack 102, such as during vehicle operation. In some examples, after insertion of the battery module(s) 104 into the battery pack 102, the vibrational frequency (e.g., modal frequency) of the battery pack may increase to a threshold amount (e.g., 10 Hertz, 20 Hertz, etc.) greater than a vibrational frequency associated with the vehicle body 112 and/or other components of the vehicle 100. In such examples, vibrational frequencies associated with the battery pack 102, the vehicle body 112, and/or components of the vehicle 100 may substantially differ. For example, a vibrational frequency associated with the vehicle body 112 may be 35 Hertz and a vibrational frequency associated with a battery pack 102 with battery module(s) 104 inserted may be 60 Hertz. The difference between the vibrational frequency of the vehicle body 112 and the vibrational frequency of the battery pack 102 (e.g., 25 Hz difference between the two) may substantially prevent the vehicle body 112 and the battery pack 102 from vibrating at a same or similar frequency, causing an audible noise to a passenger in the vehicle.

In various examples, the stiffness of the battery pack 102 may correspond to a strength of the battery pack 102, such as in a crash scenario. In such examples, the increased stiffness resulting from inserted battery modules being securely coupled to the casing 108 may provide an additional safety feature for a passenger in the case of a collision with another object (e.g., another vehicle, etc.). In some examples, after insertion of the battery module(s) 104 into the battery pack 102, the stiffness of the battery pack may increase to a threshold amount greater than a stiffness associated with a battery pack 102 with at least one battery module 104 not inserted. In some examples, the stiffness of the battery pack may increase to a threshold amount greater than a stiffness associated with an empty battery pack 102 (e.g., no battery modules inserted).

In the illustrative example, the battery pack 102 may comprise a portion of a seat upon which a passenger may sit. In such an example, the stiffness of the battery pack 102 may protect the passenger, at least in part, from an impact with another object. In various examples, the stiffness of the battery pack 102 may increase a torsional and/or lateral stiffness of the vehicle 100. In such examples, the stiffness of the battery pack 102 may increase vehicle 100 handling, steering, and/or ride characteristics. In at least one example, one or more battery modules 104 in the battery pack 102 may be offset from other battery modules 104 in the battery pack 102. For example, as illustrated in FIG. 1, the bottom two battery modules 104 in the battery packs 102 are offset from a vertical stack of four other battery modules 104. The offset design of one or more of the battery modules 104 may additionally increase a stiffness of a battery pack 102, further improving torsional and/or lateral stiffness of the vehicle 100.

In various examples, the battery module(s) 104 in a battery pack 102 may be configured substantially the same or similar. In such examples, the battery module(s) 104 in a battery pack 102 may be interchangeable. The battery module(s) 104 may include a battery housing including at least a base and four side walls. At least two of the four side walls may be configured with the couplers described above that are configured to slide along the rails 110. In some examples, the at least two of the four side walls may be configured with module attachment mechanism configured to couple to casing attachment mechanism, such as those described above. In such examples, the casing attachment mechanism may include at least a rail or a coupler and the corresponding module attachment mechanism may include the other of the rail or the coupler. In some examples, the battery housing may additionally include a cover.

The battery housing may comprise a metal material, a ceramic material, a plastic material, a composite material, or a combination thereof. The base, four side walls, and the cover may comprise a same or similar material. In some examples, the materials of the base, four side walls, and/or the cover may be determined based on a high melting point and/or high durability. For example, a cover may include a stainless-steel material due to the high melting point and high durability of the stainless-steel. In various examples, the base, the four side walls, and/or the cover may include an insulating material (e.g., mica, silicone rubber, Teflon, etc.) coupled thereto (e.g., laminated, glued, etc.). In at least one example, the cover may comprise a metal material with an insulating material laminated thereto. In at least one other example, the battery housing may include a base configured with an insulating material coupled thereto and four side walls. In such an example, the battery housing may not include a cover.

In various examples, the battery housing may enclose a plurality of cells of the battery module 104. Each cell of the plurality of cells may include a cylindrical cell, a pouch cell, a prismatic cell, a button cell, or the like. In at least one example, the cells in the plurality of cells are cylindrical cells. In some examples, the plurality of cells may be separated from one another by an insulating material. In some examples, the insulating material may comprise an insulating foam (e.g., silicone foam, silicone potting, etc.). In various examples, the insulating material disposed between individual cells of the plurality of cells may mitigate effects of thermal runaway of a single cell by isolating the cell from other cells proximate thereto. In such examples, the insulating material may enhance thermal runaway mitigation techniques by thermally isolating the cells from one another. In some examples, the insulating material may additionally explosively isolate cells from one another. In such examples, a failed cell may explode without substantially effecting other cells.

In some examples, the plurality of cells may be configured in multiple rows of cells. In some examples, the cells in a row of cells may be configured in series. In some examples, the cells in a row of cells may be configured in parallel. In some examples, each cell in a roll of cells may be configured with a positive polarity on a first side and a negative polarity on a second side opposite the first side. In such examples, a negative polarity of a first row of cells may be configured adjacent to a positive polarity of a second row of cells. In some examples, an adjacent row of cells may have an opposite polarity to a row of cells adjacent thereto. In such examples, a negative polarity of a first row of cells may be configured adjacent to a negative polarity of a second row of cells.

The plurality of cells may be electrically coupled to one another via one or more wires and/or one or more bus bars. In various examples, the cells may be coupled to the wire(s) and/or bus bar(s) via a water bond, a laser weld, or an ultrasonic weld. In some examples, the wire(s) and/or bus bar(s) may provide a means to build up a parallel or series drain associated with the plurality of cells. In various examples, a first set of wire(s) and/or bus bar(s) may be configured to carry a positive charge to a positive terminal of the battery module 104 and a second set of wire(s) and/or bus bar(s) may be configured to carry a negative charge to a negative terminal of the battery module 104. In some examples, the positive terminal may be configured at a first end of a first side wall of the battery housing and the negative terminal may be configured at a second end of a second side wall of the battery housing. In some examples, the first side wall and the second side wall may be opposing walls (e.g., on opposite sides) of the battery housing. In some examples, the first end and the second end may be opposite ends of the opposing walls. In such examples, the positive terminal and the negative terminal may be substantially diagonally situated from one another.

As will be discussed in greater detail below with regard to FIG. 2, the battery modules 104 of a battery pack 102 may be electrically coupled to one another in series. In the illustrative example, the negative terminal corresponding to a first battery module 104(1) of a battery pack 102 may be coupled to a first negative bus bar 114. Though the first battery module 104(1) is illustrated as the top battery module 104 in a battery pack 102, this is not intended to be limiting, and the first battery module 104(1) may include the bottom battery in a stack of battery modules 104, a first battery in a horizontal row of batteries, or the like. In various examples, the negative terminal corresponding to the first battery module 104(1) may represent a most negative terminal of the battery pack 102. The first negative bus bar 114 may be electrically coupled to the negative terminal of the first battery module 104(1) at a first end and a high voltage junction box 107 at a second end.

In the illustrative example, the positive terminal corresponding to the first battery module 104(1) may be electrically coupled to a negative terminal corresponding to a second battery module 104(2). In various examples, each of the positive terminal and negative terminal of adjacent battery modules 104 may be electrically coupled, building a total voltage associated with the battery pack 102. In various examples, a first positive bus bar 116 may electrically couple to the positive terminal corresponding to the last battery module 104 in the series at a first end and the high voltage junction box 107 at the second end. In such examples, the first positive bus bar 116 and the first negative bus bar 114 together may be configured to power the drive 106 module, in whole or in part.

As will be discussed in greater detail below with regard to FIG. 6, the battery pack 102 may additionally include a second positive bus bar and a second negative bus bar (not illustrated in FIG. 1). The second positive bus bar and the second negative bus bar may include high-voltage bus bars. In some examples, the second positive bus bar and the second negative bus bar may be coupled to the first positive and negative bus bars and/or the high voltage junction box 107 at a first end and a connector at a second end. The connector may be configured to transfer excess power provided by the battery modules 104 to a battery balance box 118, such as via cables, wires, and/or other electrical couplings. Additionally, the connector may be configured to receive power from the battery balance box 118, such as that provided by a second set of battery modules 104 situated in a second battery pack 102. In various examples, the battery balance box 118 may be configured to balance loads provided by the battery packs 102 of the vehicle 100.

In various examples, the second positive bus bar and/or the second negative bus bar may be configured to de-energize in the event of a thermal runaway, short, over-voltage, over-temperature, under-temperature, vehicle controller electronic control unit failure and/or failure of a battery module 104. As will be discussed in greater detail below, in some examples, de-energizing the second positive bus bar and/or the second negative bus bar may be based on a drop and/or a surge in voltage provided to the high voltage junction box 107 by the first positive bus bar and the first negative bus bar. By de-energizing the second positive bus bar and/or the second negative bus bar, the safety of the vehicle electrical system may be improved by at least removing the electrical connection between the battery balance box 118 and the drive module 106. In the event of a thermal runaway, a single battery pack may be configured to power an electric load of the vehicle 100.

Additionally, to further improve thermal runaway mitigation for batteries, the battery modules 104 may be configured to vent gases, such as gases emitted from one or more of the plurality of cells. In various examples, gases may vent out of an uncovered surface of the battery modules 104. In such examples, the battery modules 104 may not include a cover, and gas may be free to vent from the plurality of cells into a space between modules and/or between a module and an interior surface of the casing. In some examples, the gases may vent out of the battery module via one or more battery module vents. In some examples, the gases may vent from an interior compartment of the battery module 104 into a corresponding battery module bay. The battery module bay may comprise a battery module space in which the battery module 104 occupies when inserted and/or a space surrounding at least the portion of the battery module 104. In various examples, with a battery module 104 inserted into the battery module bay, the space surrounding the at least the portion of the battery module 104, such as battery module 104(2), may be bound at a bottom end by the rails 110 corresponding to the battery module 104(2), such as rails 110(2), and at a top end by the rails 110 corresponding to an adjacent battery module 104, such as rails 110(1) corresponding to battery module 104(1). In such examples, the rails 110(1) and 110(2) may be configured to thermally insulate a battery module bay from another battery module bay (e.g., battery module 104(1) from battery module 104(2), and vice versa).

In various examples, each battery module bay of the battery pack may include one or more vents 120 (e.g., casing vents 120) for venting gases outside of the vehicle. The casing vent(s) 120 may be configured to substantially equalize pressure between the battery module bay (e.g., space containing gas) and an atmosphere outside the vehicle. In some examples, the casing vent(s) 120 may comprise a breathable material (e.g., membrane) configured to filter contaminants from gases exiting the casing vent(s) 120. In various examples, the casing vent(s) 120 may be configured to blow out (e.g., removed from casing to maximize a pressure equalization), such as when subjected to a threshold pressure differential between the battery module bay and the atmosphere outside the vehicle. The battery module vent(s) and the casing vent(s) 120 may prevent a battery module from over-pressurizing and/or over-heating, such as in the case of a cell failure and/or thermal runaway, thereby improving thermal runaway mitigation of the electrical system.

Figure 2:
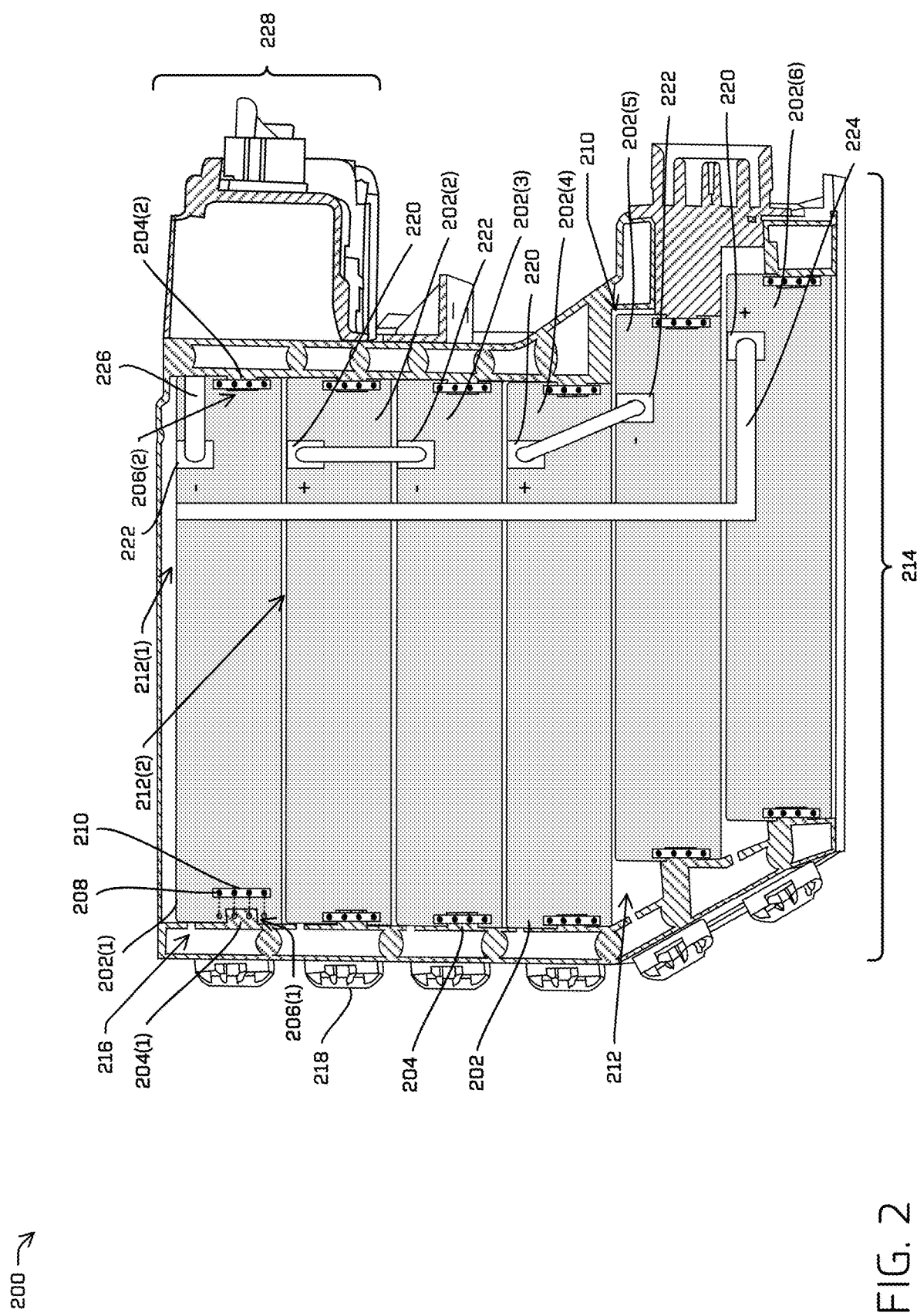
FIG. 2 is a side view of an example battery pack of an electrical system configured to provide power to a vehicle, in accordance with embodiments of the disclosure.

FIG. 2 is a side view of an example battery pack 200, such as battery pack 102, of an electrical system configured to provide power to a vehicle, in accordance with embodiments of the disclosure. The battery pack 200 includes a plurality of battery modules 202, such as battery modules 104. In various examples, the battery modules 202 in a battery pack 200 may be configured substantially the same, and thus may be interchangeable in the battery pack 200.

In the illustrative example, the battery pack 200 includes six stacked battery modules 202, the bottom two battery modules 202 being slightly offset from the other four battery modules 202. In other examples, the battery pack 200 may include a greater or lesser number of battery modules 202. Additionally, in other examples, the battery modules 202 may be disposed in different orientations within the battery pack 200. The different orientations may include battery modules 202 being disposed substantially horizontally, both horizontally and vertically, vertically with no offset, horizontally and/or vertically with more battery modules 202 offset, or the like.

In various examples, the battery module(s) 202 may be inserted into the battery pack 200 via rails 204, such as rails 204(1) and 204(2). In such examples, couplers 206 (e.g., module couplers), such as couplers 206(1) and 206(2) of the battery module(s) 202 may couple to the rails 204(1) and 204(2). In some examples, the rails 204 and the couplers 206 may comprise module attachment mechanisms. In the illustrative example, the couplers are configured in a substantially rectangular shape. In some examples, the couplers 206 may be configured such that at least a portion thereof may include a substantially circular shape, ovular shape, and/or other curved and/or linear shape. In various examples, the couplers 206 may extend the length of a side wall of the battery module 202. In some examples, the couplers 206 may extend at least a portion of the length of the side wall of the battery module 202.

In the illustrative example, the module attachment mechanisms include two couplers 206(1) and 206(2) on the battery modules 202 (e.g., module couplers) and two rails 204(1) and 204(2) of the battery pack 200. The couplers 206(1) and 206(2) may be configured to couple to and slide along the rails 204(1) and 204(2). In other examples, the module attachment mechanism may include a single rail and a single module coupler disposed on the battery module 204. In such examples, the single rail and the single module coupler may be configured to couple to a single casing coupler and a single rail of the battery pack 200, respectively.

In some examples, the battery modules 202 may be secured into place in the battery pack 200 via one or more fasteners 208. The fastener(s) 208 may include screws, bolts, rivets, pins, snap connectors, latches, spring fasteners, and/or any other mechanical fasteners. In at least one example, the fastener(s) 208 may be reusable components, such as, for example, those configured to rotate in to secure the battery module(s) 202 in place and rotate out to remove the battery module 202. In various examples, the fastener(s) 208 may secure a side wall of the casing to the rails 204 and/or the battery module 202. In some examples, the battery modules 202 may secure a plate 210 to the rails 204 and/or the battery module 202. The plate 210 may include a metal material, a ceramic material, a plastic material, a composite material, or the like.

In various examples, the battery module(s) 202 may each be housed in a battery module bay 212 of the battery pack 200. Each battery module bay 212, such as battery module bays 212(1) and 212(2) may include a space in which to house a battery module 202, such as battery modules 202(1) and 202(2), respectively, and a space surrounding at least a portion of the battery module 202. The space surrounding the at least the portion of the battery module 202 may provide an air gap between two battery modules, such as the illustrated space between battery modules 202(1) and 202(2). In some examples, the space surrounding the at least the portion of the battery module 202 may assist in thermally isolating the battery modules 202 from one another, such as in the event of a battery module 202 thermal runaway (e.g., accelerating temperature increase).

In various examples, the battery modules 202 may be configured with one or more battery vents (not illustrated) to vent gases out of respective battery modules 202. In some examples, the battery vent(s) may be disposed along a side wall of the battery modules 202, extending at least partially along a length of the side wall. In at least one example, the battery vent(s) may be disposed above the couplers 206 on the side walls and may extend substantially the length of the side walls on opposing sides. In some examples, in the event of a thermal runaway of one or more cells of a battery module 202, hot gases generated from the thermal runaway may exit the battery module via the battery vent(s). In various examples, the battery modules 202 may be configured with no cover or top surface. In such examples, the battery modules 202 may be configured to vent gases directly out of the uncovered top of the battery module 202 and into the associated battery module bay.

In various examples, the rails 204 may be configured to substantially preclude the hot gases exiting a battery module, such as battery module 202(2) from substantially effecting a second battery module, such as battery module 202(1), such as by substantially thermally isolating (e.g., insulating) the battery modules 202. In such examples, the rails 204(1) and 204(2) may provide a barrier configured to limit gas flow between battery module bay 212(2) and battery module bay 212(1). Substantially precluding the hot gases from entering the battery module bay 212(1), and consequently surrounding battery module 202(1), may reduce an impact of the thermal runaway of battery module 202(2) on an internal temperature of battery module 202(1).

In some examples, the rails 204 may include a coating. The coating may include rubber, polyurethane, nylon, Teflon, silicone, polypropylene, polyethylene, or the like. In some examples, the coating may be configured to increase or decrease a frictional component between the rails 204 and the couplers 206 of the battery modules 202. In some examples, the coating may be configured to assist in substantially thermally isolating one battery module, such as battery module 202(2), from another battery module 202, such as battery module 202(1). In such examples, the coating may assist in preventing gases from passing through the couplers 206 between the battery module 202 and the respective rails 204.

In some examples, gases exiting the battery module 202 via the battery vents may be configured to flow into the respective battery module bay 212. In some examples, the gases may be configured to flow into a portion of a battery pack casing 214 (e.g., frame), such as casing 108. In various examples, the portion of the battery pack casing 214 may include an opening 216 for gases to flow from the battery module 202 and/or the battery module bay 212 into the portion of the battery pack casing 214.

In various examples, the battery pack casing 214 may include one or more vents 218, such as vent(s) 120. The vent(s) 218 may be configured to vent gases from inside the battery pack casing 214 to an external environment (e.g., outside the vehicle). In various examples, the vent(s) 218 may be configured to substantially equalize pressure between the battery module bay 212 and/or the portion of the battery pack casing 214 (e.g., space containing gas) and an atmosphere outside the vehicle. In some examples, the vent(s) 218 may comprise a breathable material (e.g., membrane) configured to filter contaminants from gases exiting the vent(s) 218. In various examples, the vent(s) 218 may be configured to blow out, such as when subjected to a threshold pressure differential between the battery module bay 212 and/or the portion of the battery pack casing 214 and the atmosphere outside the vehicle. As a non-limiting example, blowing out based on such a pressure differential will cause the vent(s) 218 to be physically ejected from the battery pack casing 214, creating a larger opening for pressure stabilization. In some examples, each battery module bay 212 may have associated therewith at least one vent 218 for expelling gases. In such examples, gases substantially trapped within the battery module bay 212 may be discharged out the respective vent(s) 218.

In some examples, the battery modules 202 may each include a plurality of cells for generating electrical power. As will be discussed in further detail below with respect to FIGS. 5A and 5B, the positive cell terminals may be electrically coupled to one another and the negative cell terminals may be electrically coupled to one another. The positive cell terminals may be coupled to a positive terminal 220, to which the electrons from the plurality of cells flow, and the negative cell terminals may be coupled to a negative terminal 222. In at least one example, the positive terminal 220 and the negative terminal 222 may be disposed on opposite side walls and on opposite ends of each battery module 202. In the illustrative example, each battery module may be inserted into the battery pack 200 such that opposing polarities of battery modules are configured next to one another. For example, a negative terminal 222 associated with battery module 202(1) is disposed proximate to a positive terminal 220 associated with battery module 202(2), and so on.

In various examples, the battery modules 202 in a battery pack 200 may be configured in series. In the illustrative example, a positive terminal 220 associated with battery module 202(2) is electrically coupled to a negative terminal 222 associated with battery module 202(3), and a positive terminal 220 associated with battery module 202(4) is electrically coupled to a negative terminal 222 associated with battery module 202(5). Although not illustrated, adjacent positive terminals 220 and negative terminals 222 configured on respective opposing sidewalls to those illustrated in FIG. 2 may additionally be electrically coupled to one another. For example, a positive terminal 220 associated with battery module 202(1) may be electrically coupled to a negative terminal 222 associated with battery module 202 (2), and so on.

In at least one example, the positive terminal 220 associated with battery module 202(6) may include a most positive terminal in the battery pack 200 and the negative terminal 222 associated with the battery module 202(1) may include the most negative terminal in the battery pack 200. As illustrated in FIG. 2, the positive terminal 220 associated with battery module 202(6) may be coupled to a first positive bus bar 224 and the negative terminal 222 associated with battery module 202(1) may be coupled to a first negative bus bar 226.

The first positive bus bar 224 and the first negative bus bar 226 may be electrically coupled to a high voltage junction box 228 associated with the battery pack 200. The high voltage junction box 228 may be configured to monitor a voltage and/or current provided by the first positive bus bar 224 and the first negative bus bar 226, and provide power carried therefrom to a drive module associated with the battery pack 200. The drive module may include one or more components for monitoring and/or controlling the vehicle associated with the battery pack 200.

Figure 3:
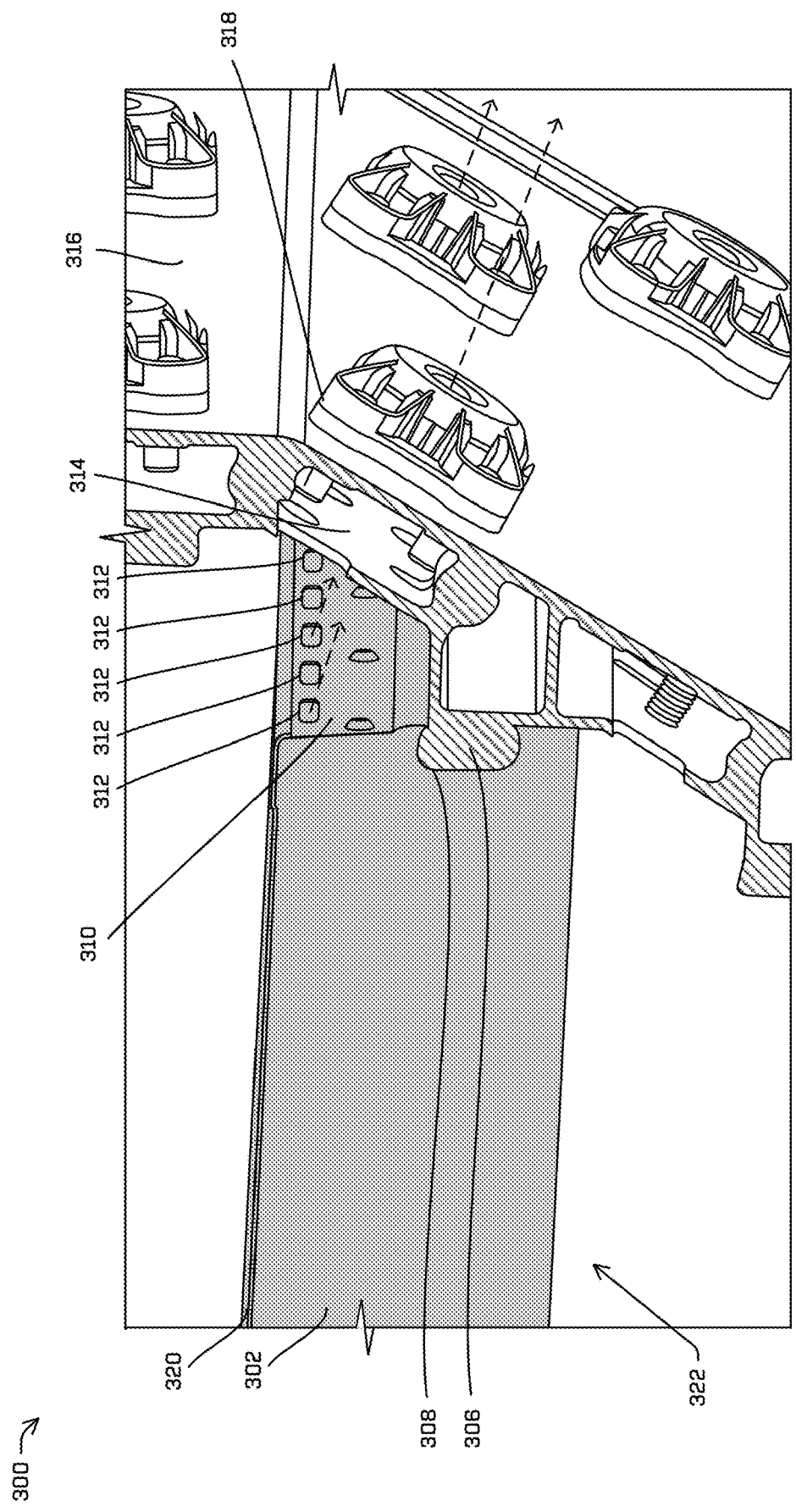
FIG. 3 is a close-up view of a battery pack with a battery module inserted therein, the close-up view illustrating venting of the battery pack, in accordance with embodiments of the disclosure.

FIG. 3 is a close-up view of a battery pack 300, such as battery pack 102, housing a battery module 302, such as battery module 104, the close-up view illustrating venting capabilities of the battery module 302 and the battery pack 300, in accordance with embodiments of the disclosure.

As discussed above, the battery module 302 may be inserted into the battery pack 300 via one or more rails 306, such as the rails 110. The rail(s) 306 may be configured to attached to couplers 308 located on a side wall 310 of the battery module 302. In various examples, the side wall 310 may include one or more battery module vents 312. The battery module vent(s) 312 may be configured to vent gases out of an interior compartment of the battery module 302, and into a battery module bay of the battery pack 300 into which the battery module 302 is inserted. In some examples, the gases may vent into a portion 314 of a casing 316 (e.g., frame) of the battery pack 300.

In various examples, the battery pack 300 may include one or more vents 318, such as vent(s) 120. The vent(s) 318 may be configured to vent gases from the battery module bay associated with the battery module 302 and/or the portion 314 of the casing 316 to an external environment (e.g., outside a vehicle associated with the battery pack 300). In various examples, the vent(s) 318 may be configured to substantially equalize pressure between the interior compartment of the battery module 202, the associated battery module bay and/or the portion 314 of the casing 316 (e.g., space containing gas) and the external environment. In some examples, the vent(s) 318 may comprise a breathable material (e.g., membrane) configured to filter contaminants from gases exiting the vent(s) 318. In various examples, the vent(s) 318 may be configured to blow out, such as when subjected to a threshold pressure differential between the battery module bay and/or the portion of the battery pack casing 214 and the external environment. As a non-limiting example, blowing out based on such a pressure differential will cause the vent(s) 318 to be physically ejected from the battery pack casing, creating a larger opening for pressure stabilization. In the illustrative example, the battery module bay associated with battery module 302 includes two vents 318. In other examples, each battery module bay may have a greater or lesser number of vent(s) 318.

In various examples, the gases exiting the interior compartment of the battery module 302 may include hot gases generated by one or more cells of the battery module 302, such as in thermal runaway of the cell(s). In such examples, the expelling of hot gases out of the battery module vent(s) 312 and the vent(s) 318 may substantially mitigate negative effects caused by the thermal runaway. For example, the escape of hot gases may reduce an effect the hot gases may have on another battery module in the battery pack 300.

Additionally, to mitigate an effect of thermal runaway, the battery module 302 may include a cover 320 configured to reduce heat transfer. The cover 320 may comprise a sheet of metal material, ceramic material, composite material, plastic material, or a combination thereof. In at least one example, the cover 320 may comprise a sheet of stainless steel material. In some examples, the cover 320 may include an insulating material (e.g., mica, silicone rubber, Teflon, etc.), such as that laminated, glued, or otherwise affixed to the sheet. In various examples, the cover 320 may be configured to substantially thermally insulate the battery module 302 from another battery module inserted above the battery module 302.

The battery module may also include a base 322. The base 322 may include a metal material, ceramic material, composite material, plastic material, or a combination thereof. In some examples, the base 322 may be configured to reduce heat transfer between the battery module 302 and another battery module inserted below the battery module 302. In such examples, the base 322 may include an insulating material (e.g., mica, silicone rubber, Teflon, etc.), such as that laminated, glued, or otherwise affixed to the base 322 (and/or constituting the entirety of the base). In various examples, the base 322 and the cover 320 may comprise a same or a different material and/or include a same or a different insulating material. In some examples, the battery module may include one or the other of an insulated base 322 or an insulated cover 320.

Figure 4A:
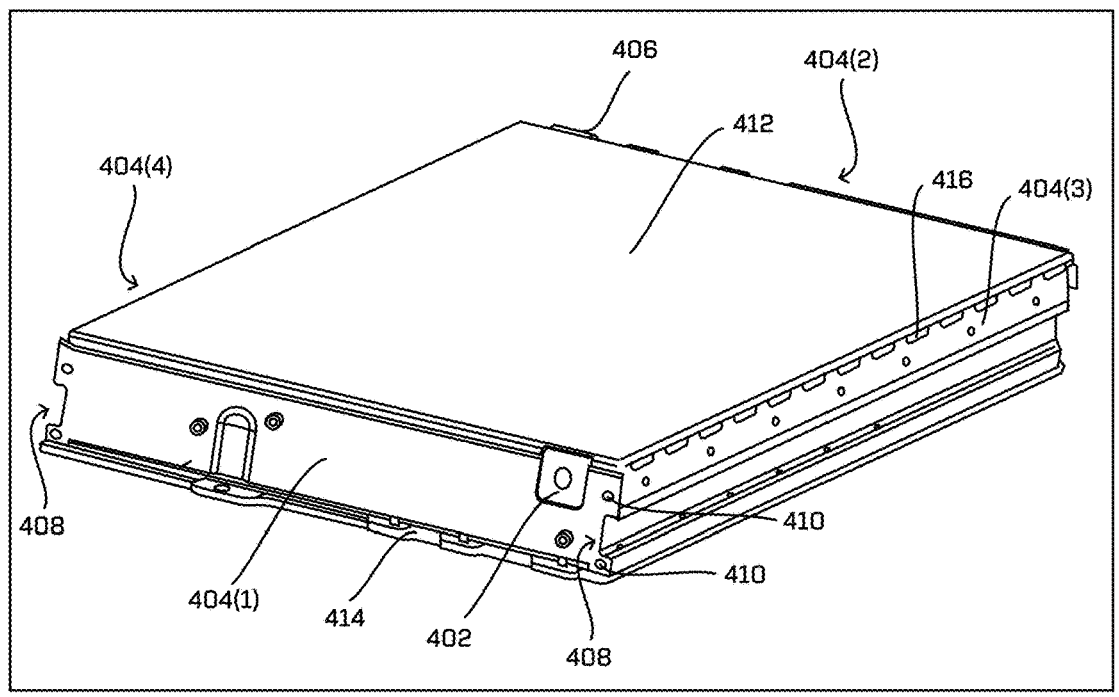
FIGS. 4A and 4B are illustrations of an example battery module.
Figure 4B:
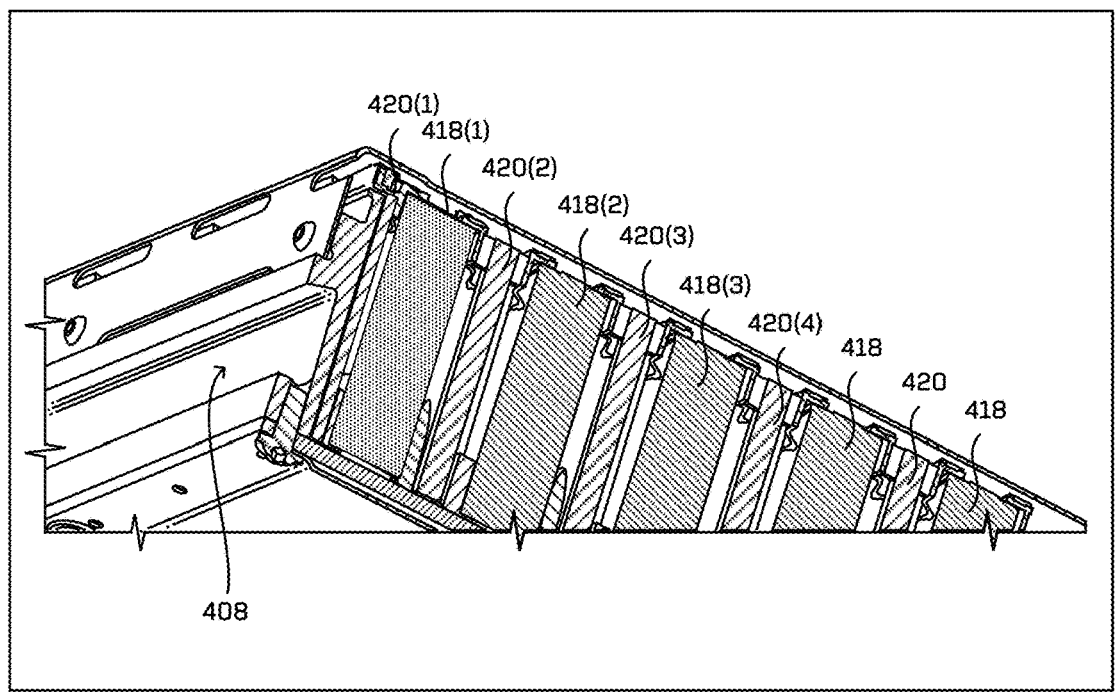

FIGS. 4A and 4B are illustrations of an example battery module 400, such as battery module 104. FIG. 4A is perspective view of the battery module 400 with a first terminal 402 located on a first side wall 404(1) of the battery module and a second terminal 406 located on a second side wall 404(2) of the battery module, the first terminal 402 and the second terminal 406 being located diagonally opposite one another. The diagonally opposite disposition of the first terminal 402 and the second terminal 406 may substantially negate a danger of electrical arcing between the first terminal 402 and the second terminal 406. Accordingly, the disposition may increase the safety associated with use of the battery module 400.

The first terminal 402 and the second terminal 406 may be coupled to a plurality of cells located within the battery module 400. In various examples, the first terminal 402 may comprise a positive terminal. In such examples, the first terminal may be coupled to positive cell terminals associated with the plurality of cells and the second terminal 406, a negative terminal, may be coupled to negative cell terminals associated with the plurality of cells. In some examples, the first terminal 402 may comprise a negative terminal. In such examples, the first terminal may be coupled to negative cell terminals associated with the plurality of cells and the second terminal 406, a positive terminal, may be coupled to positive cell terminals associated with the plurality of cells.

The battery module 400 may include a third side wall 404(3) and a fourth side wall 404(4). The third side wall 404(3) and the fourth side wall 404(4) may include couplers 408. In the illustrative example, the couplers 408 may extend the length of the third side wall 404(3) and the fourth side wall 404(4). In other examples, the couplers 408 may extend over a portion of the respective side walls 404(3) and/or 404(4). The couplers 408 may be configured to couple to the battery module 400 to rails of a battery pack, such as battery pack 102. The battery module 400 may be inserted into the battery pack by sliding the couplers 408 along the rails of the battery pack. Once inserted, the battery module 400 may be secured in place via one or more fasteners, such as fastener(s) 208. The fastener(s) may be secured into the battery module 400 via one or more attachment points 410.

The first side wall 404(1), the second side wall 404(2), the third side wall 404(3), and the fourth side wall 404(4) may include a metal material, a ceramic material, a composite material, a plastic material, or a combination thereof. The side walls 404(1), 404(2), 404(3), and 404(4) may include substantially the same or a different material. In some examples, the first side wall 404(1) and the second side wall 404(2) may include the same or a similar material. In some examples, the third side wall 404(3) and the fourth side wall 404(4) may include the same or a similar material.

The battery module 400 may additionally include a cover 412 and/or a base 414. The cover 412 and/or the base 414 may include a metal material, a ceramic material, a composite material, a plastic material, or a combination thereof. The cover 412 and the base may include a similar or a different material. In some examples, the cover 412 and/or the base 414 may include an insulating material. In at least one example, the cover 412 and/or the base 414 may include a stainless-steel sheet with a mica material laminated thereto. In such examples, the cover may be configured to substantially thermally insulate the battery module 400 from another battery module inserted above the battery module 400 in the battery pack.

In various examples, the battery module 400 may not include a cover 412. In such examples, the battery module 400 may be configured to vent gas out the uncovered top end of the battery module 400. As illustrated in FIG. 4A, in some examples, the battery module 400 may include battery module vents 416, such as battery module vent(s) 312. The battery module vents 416 may be configured to vent gas out of the battery module 400. In the illustrative example, the battery module 400 may include a plurality of battery module vents 416 disposed along the length of the third side wall 404(3). In some examples, the battery module 400 may include one or more battery module vents disposed along a portion of the third side wall 404(3) (e.g., less than the length thereof). In various examples, the fourth side wall 404(4) may additionally include battery module vents 416. In some examples, the fourth side wall 404(4) may include battery module vents 416 disposed substantially the same as the battery module vents 416 disposed on the third side wall 404(3).

FIG. 4B is a close-up view of a cross-section of the battery module 400, the close-up view depicting the coupler 408 configured to secure the battery module 400 into the battery pack and a plurality of cells 418 located within the battery module 400. As discussed above, the coupler 408 may be configured to couple to a rail system of the battery pack. The battery module 400 may be inserted into the battery pack by sliding the coupler 408 along a respective rail of the rail system.

As illustrated in FIG. 4B, the battery module 400 may include the plurality of cells 418 located in an internal compartment thereof. In various examples, the cells 418 may be configured in rows. As will be shown below with regard to FIG. 5A, in various examples, the rows of cells 418 may be offset from one another. In such examples, each cell 418 in a row may be disposed at an angle and/or a distance from a cell 418 in an adjacent row. In some examples, the angle may be about 45 degrees. In other examples, the angle may be greater or less than 45 degrees.

In various examples, each cell 418 in a row may be configured with a positive polarity (e.g., positive cell terminal) situated on a first side and a negative polarity (e.g., negative cell terminal) situated on a second side. In various examples, the polarity of the cells 418 of adjacent rows may opposite, such that the positive cell terminals of adjacent rows are situated proximate one another. In some examples, the polarity of the cells 418 of adjacent rows may be the same, such that the positive cell terminals of a first row are situated proximate the negative cell terminals of an adjacent row. In such examples, the positive and negative cell terminals of adjacent rows may be coupled to bus bars 420 and/or wires. For example, a first row may be associated with cells 418(1) and a second row may be associated with cells 418(2). Negative cell terminals associated with cells 418(1) may be coupled to a first bus bar 420(1). The first bus bar 420(1) may carry the negative charge to a negative battery terminal (e.g., first terminal 402 or second terminal 406). Positive cell terminals associated with the cells 418(1) may couple to a second bus bar 420(2). Additionally, negative cell terminals associated with the second row of cells 418(2) may be coupled to the second bus bar 420(2). Positive cell terminals associated with the second rows of cells 418(2) may be coupled to a third bus bar 420(3), as well as negative cell terminals associated with a third row of cells 418(3). Positive cell terminals associated with the third row of cells 418(3) may be coupled to a fourth bus bar 420(4), and so on. In some examples, the second bus bar 420(2), the third bus bar 420(3), and/or the fourth bus bar 420(4) may be coupled to a positive battery terminal (e.g., first terminal 402 or second terminal 406). In such examples, the second bus bar 420(2), the third bus bar 420(3), and/or the fourth bus bar 420(4) may carry a charge from the cells 418 to the positive battery terminal.

Figure 5A:
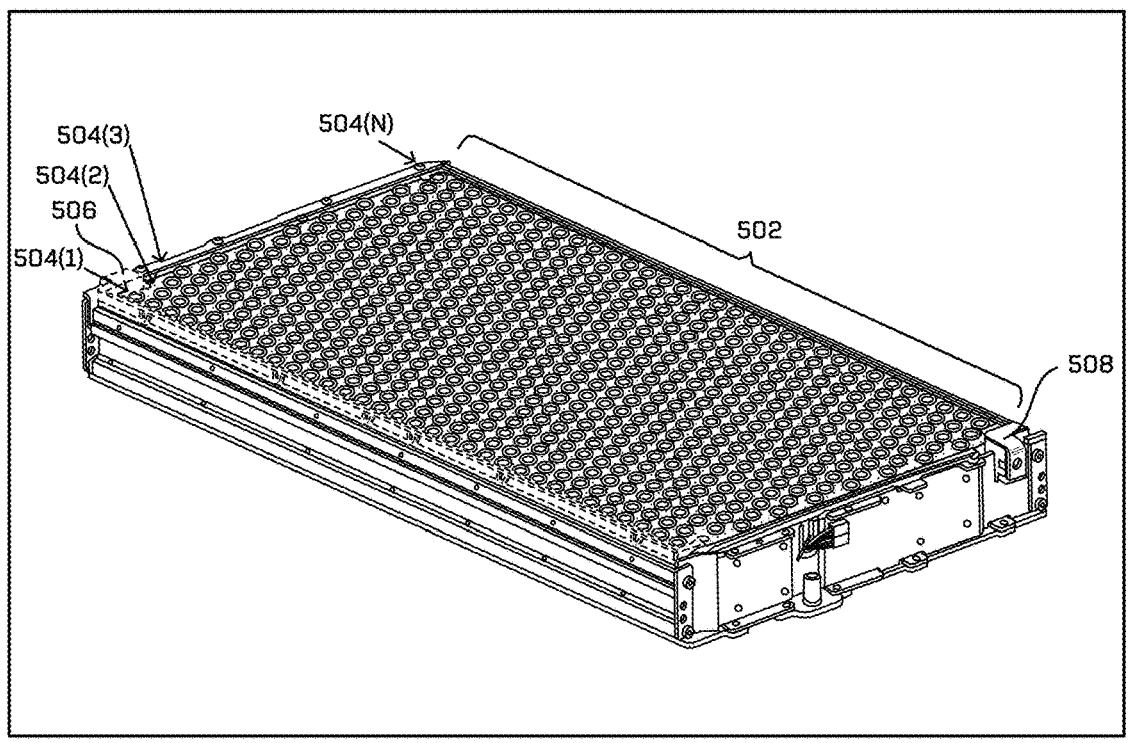
FIGS. 5A and 5B are illustrations of example internal components of a battery module, in accordance with embodiments of the disclosure.
Figure 5B:
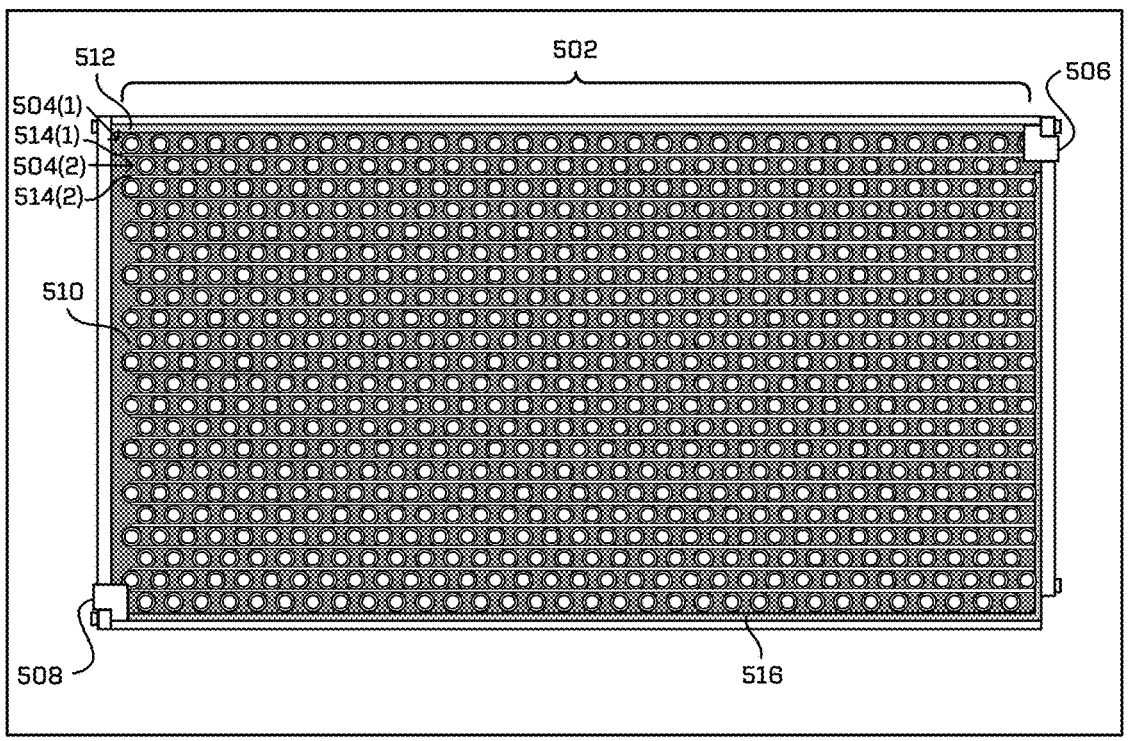

FIGS. 5A and 5B are illustrations of example internal components of a battery module 500, such as battery module 104, in accordance with embodiments of the disclosure. FIG. 5A depicts a plurality of battery cells 502 configured in rows 504(1), 504(2), 504(3), through 504(N). In some examples, each of the rows 504(1), 504(2), 504(3) through 504(N) may include thirty-six (36) cells. In other examples, each of the rows 504(1), 504(2), 504(3) through 504(N) may include a greater or lesser number of cells.

As discussed above, the cells 502 associated with a first row 504(1) and the cells 502 associated with a second row 504(2) may be offset a distance and/or an angle from one another. In at least one example, the offset may include an angle of about 45 degrees. In other examples, the offset may include an angle greater or less than 45 degrees. In various examples, cells 502 associated with alternating rows, such as the first row 504(1) and the third row 504(3) may be aligned with one another.

In various examples, the cells 502 associated with a row 504(1) may be configured with a positive cell terminal on a first side (e.g., top side) of the cells 502 and a negative cell terminal on a second side (e.g., bottom side) of the cells. In some examples, the cells 502 may be configured with a positive cell terminal in a top-most centered position of the cell 502 and a negative cell terminal situated slightly below and encircling the positive cell terminal. In some examples, the cell terminals of opposite polarity of the first row 504(1) and the second row 504(2) may be coupled to a first bus bar or wire. Additionally, the cell terminals of opposite polarity of the second row 504(2) and the third row 504(3) may be coupled to a second bus bar or wire.

In some examples, negative cell terminals associated with the first row 504(1) may be coupled to a first terminal 506 (e.g., negative terminal) of the battery module 500. In such examples, the first terminal 506 may include a most negative charge of the battery module 500. In various examples, bus bars coupled to positive and negative cell terminals of adjacent rows 504(1) though 504(N) may be configured to carry a charge to a second terminal 508 (e.g., positive terminal) of the battery module 500. In the illustrative example, the first terminal 506 and the second terminal 508 may be diagonally disposed on opposite side walls of the battery module. The diagonal disposition of the first terminal 506 and the second terminal 508 may reduce a probability of electrical arcing occurring between the first terminal 506 and the second terminal 508, thereby improving safety associated with battery module 500 use.

FIG. 5B is top view of the plurality of battery cells 502 electrically coupled to the first terminal 506 and the second terminal 508. In various examples, the plurality of cells 502 may be thermally insulated from one another by an insulating material 510. In some examples, the insulating material 510 may comprise an insulating foam (e.g., silicone foam, silicone potting, etc.). In various examples, the insulating material 510 disposed between individual cells of the plurality of cells 502 may mitigate effects of thermal runaway of a single cell by isolating the cell from other cells proximate thereto. In such examples, the insulating material 510 may reduce thermal runaway effects. In some examples, the insulating material 510 may additionally explosively isolate cells from one another. In such examples, a failed cell may explode without substantially affecting other cells.

As discussed above, in some examples, negative cell terminals associated with a first row 504(1) may be coupled to a first main bus bar 512. In such examples, the first main bus bar 512 may carry a negative charge to the first terminal 506. In various examples, positive cell terminals and negative cell terminals associated with adjacent rows, such as first row 504(1) and 504(2), may be coupled to bus bars 514 or wires. In some examples, the bus bars 514 or wires may connect directly to the second terminal 508. In some examples, the bus bars 514 or wires may carry a charge to the second terminal 508 via a second main bus bar 516. For example, positive cell terminals associated with the first row 504(1) and negative cell terminals associated with the second row 504(2) may couple to a first bus bar 514(1) or wire. The positive cell terminals associated with the second row 504(2) may be coupled to the second bus bar 514(2) or wire. The first bus bar 514(1) and the second bus bar 514(2) may couple to the second main bus bar 516 and deliver a charge to the second terminal 508 via the second main bus bar 516. In some examples, cells may be positioned in a same direction such that gases vent out in the direction of orientation of the cell. In some examples, orientations of the cells may be determined to optimize gas flow and, hence, thermal control of the cell and/or to mitigate potential thermal runaway effects.

Figure 6:
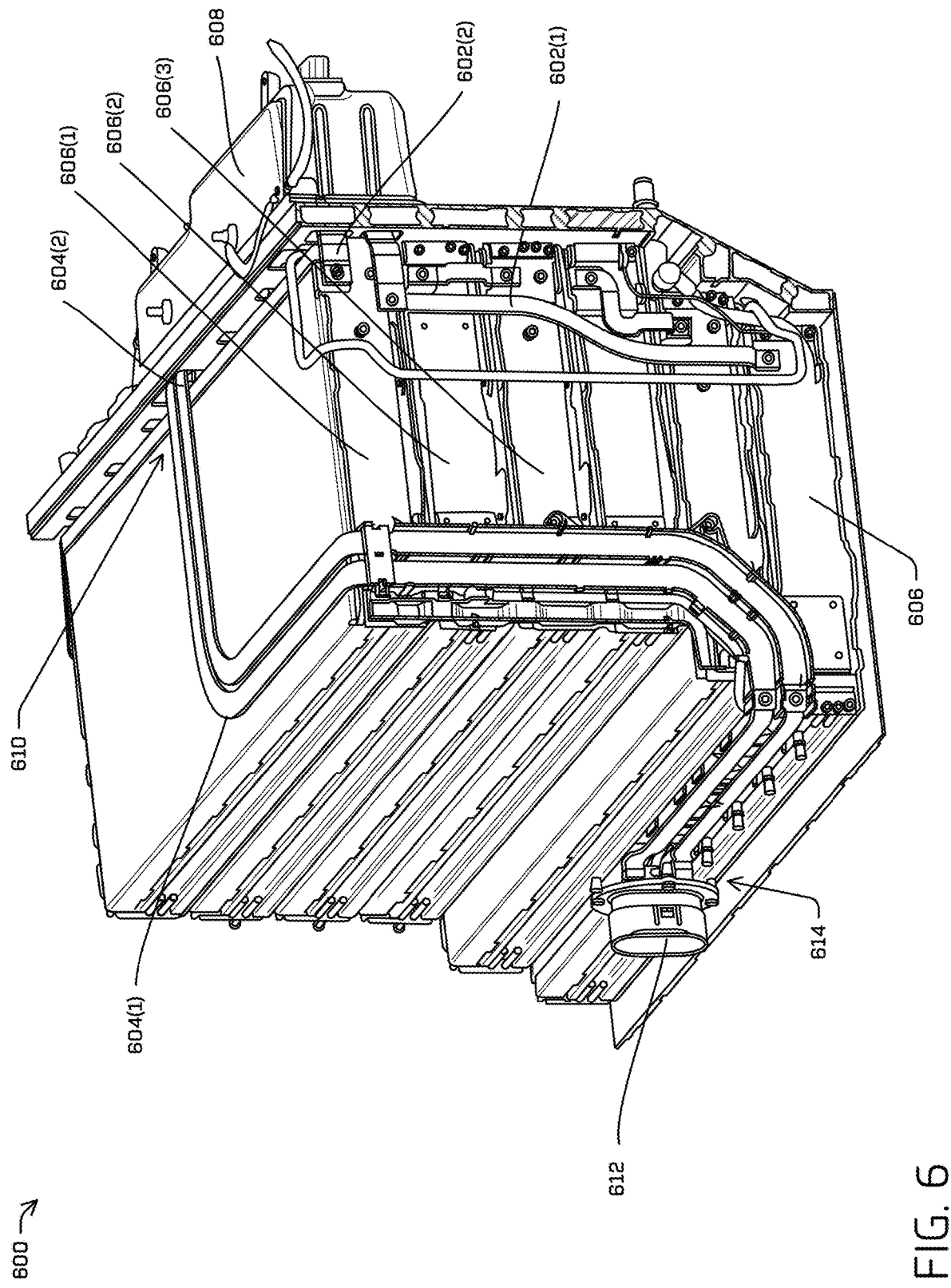
FIG. 6 is an illustration of example battery pack configured with first bus bars and second bus bars, in accordance with embodiments of the disclosure.

FIG. 6 is an illustration of example battery pack 600, such as battery pack 102, including first bus bars 602(1) and 602(2) and second bus bars 604(1) and 604(2), in accordance with embodiments of the disclosure. The first bus bars 602(1) and 602(2) may include a first positive bus bar 602(1) and a first negative bus bar 602(2). The second bus bars 604(1) and 604(2) may include a second positive bus bar 604(1) and a second negative bus bar 604(2). The second positive bus bar 604(1) and the second negative bus bar 604(2) may include high-voltage bus bars.

In various examples, the battery modules 606 in the battery pack 600 may be configured in series. In such examples, a positive terminal of a first battery module 606(1) may be electrically coupled to a negative terminal of a second battery module 606(2), a positive terminal of the second battery module 606(2) may be electrically coupled to a negative terminal of a third battery module 606(3), and so on.

In the illustrative example, the first positive bus bar 602(1) may carry a most positive charge from a battery module 606 at the end of the series (e.g., a bottom battery module in a stack) to a high voltage junction box 608 of the vehicle and the first negative bus 602(2) bar may carry a most negative charge of the battery pack from a first battery module 606(1) to the high voltage junction box 608.

In various examples, the second positive bus bar 604(1) and the second negative bus bar 604(2) may additionally be electrically coupled to the high voltage junction box 608 at a first end 610 and a connector 612 at a second end 614. In some examples, the connector 612 may include a floating connector. In such examples, the connector 612 may be configured to accommodate relative misalignment of plugs, such as that caused by vibration and/or other movement of the vehicle. In various examples, the connector 612 may be configured to transfer power provided by the battery modules 606 to a battery balance box (e.g., battery balance box 118), such as via a cable, wire, or other electrical coupling. Additionally, the connector 612 may be configured to receive power from the battery balance box, such as that provided by a second set of battery modules situated in a second battery pack. The battery balance box may be configured to maximize the capacity of each battery pack by modulating the charge and/or discharge of batteries based on the capacity associated therewith. In various examples, the second positive bus bar 604(1) and the second negative bus bar 604(2) may be configured to carry power from the high voltage junction box 608 associated with the battery pack 600 and/or carry power to the high voltage junction box 608 associated with the battery pack 600, such as when the battery balance box determines that an unequal amount of power is provided by two or more battery packs of a vehicle.

In various examples, the second positive bus bar 604(1) and/or the second negative bus bar 604(2) may be configured to de-energize in the event of a thermal runaway and/or failure of a battery module associated with the battery pack. In some examples, the second positive bus bar 604(1) and/or the second negative bus bar 604(2) may de-energize based at least in part on a drop and/or surge in voltage provided to the high voltage junction box 608 by the first positive bus bar 602(1) and the first negative bus bar 602(2). In some examples, the second positive bus bar 604(1) and/or the second negative bus bar 604(2) may be de-energized based on a drop and/or surge in voltage exceeding a threshold voltage, such as that indicative of a thermal runaway and/or failure of a battery module 606. In various examples, the high voltage junction box 608 may detect the drop and/or surge in voltage and may de-energize one or both of the respective second bus bars 604(1) and 604(2). In some examples, the battery balance box may detect the drop and/or surge in voltage and may de-energize one or both of the respective second bus bars 604(1) and 604(2). For example, the second battery module 606(2) in the battery pack 600 may short circuit due to a failure of one or more cells corresponding to the third battery. The voltage provided by the battery pack may consequently drop resulting in a total voltage provided to high voltage junction box 608 being less than an expected voltage (e.g. less than a voltage required to run the components of the high voltage junction box 608, less than a threshold voltage, etc.). Based on the voltage drop, the high voltage junction box 608 and/or battery balance box may sense a failure in the battery pack 600 and de-energize the second positive bus bar 604(1) and/or the second negative bus bar 604(2).

Figure 7:
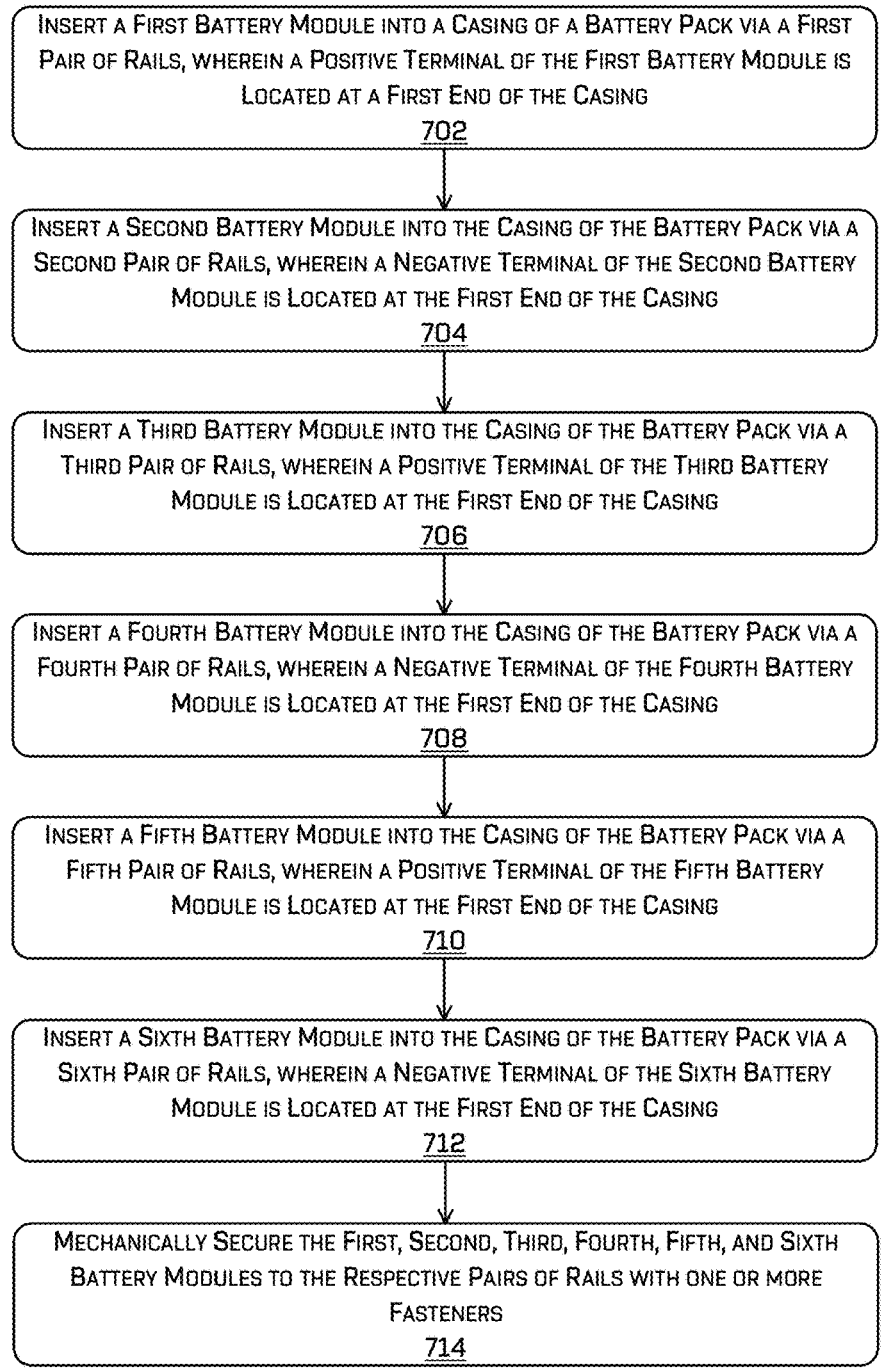
FIG. 7 depicts an example process for inserting battery modules into a battery pack.
Figure 8:
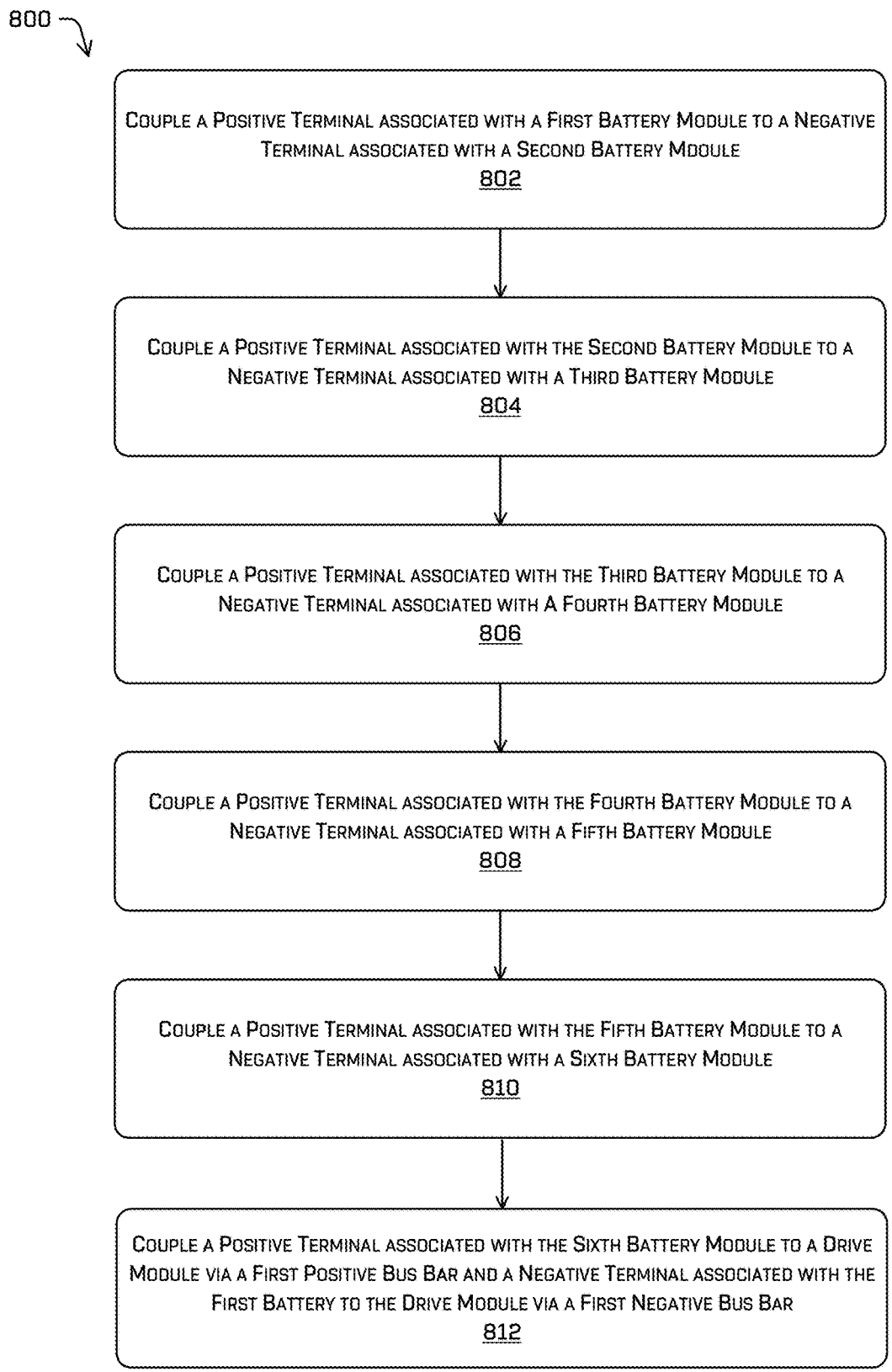
FIG. 8 depicts an example process for coupling battery modules of a battery pack to one another.

FIGS. 7 and 8 illustrate example processes in accordance with embodiments of the disclosure. These processes are illustrated as logical flow graphs, each operation of which represents a sequence of operations that may be implemented manually, such as in configuring a battery pack for operation in a vehicle. The order in which the operations are described is not intended to be construed as a limitation, and any number of the described operations may be combined in any order and/or in parallel to implement the processes.

FIG. 7 depicts an example process 700 of inserting battery modules into a battery pack. In various examples, the battery modules of the battery pack may be interchangeable. In such examples, a first battery module may include the same or substantially similar components as a second battery module, and so on.

At operation 702, the process may include inserting the first battery module into a casing of a battery pack via a first pair of rails, wherein a positive terminal of the first battery module is located at a first end of the casing. In various examples, the first pair of rails may comprise a part of the casing. In some examples, the rails may be coupled to the casing, such as via one or more fasteners. The first battery module may include couplers disposed on opposing side walls and configured to slide along the pairs of rails.

As discussed above, the pairs of rails may include a coating. In various examples, the coating may be configured to increase a frictional component between the rails and the couplers of the battery module. In some examples, the coating may be configured to substantially prevent gases from flowing between a first battery module bay above the first pair of rails and a second battery module bay below the first pair of rails. In such examples, the coating may be configured to substantially thermally insulate one battery module bay from another battery module bay, and consequently the first battery module from the second battery module.

At operation 704, the process may include inserting the second battery module into the casing of the battery pack via a second pair of rails, wherein a negative terminal of the second battery module is located at the first end of the casing. To align the positive terminal of the first battery module and the negative terminal of the second battery module, the second battery module may be rotated about a vertical axis about 180 degrees relative to the first battery module. In various examples, the positive terminal of the first battery module and the negative terminal of the second battery module may be electrically coupled to one another.

At operation 706, the process may include inserting a third battery module into the casing of the battery pack via a third pair of rails, wherein a positive terminal of the third battery module is located at the first end of the casing. To align the negative terminal of the second battery module and the positive terminal of the third battery module, the third battery module may be rotated about a vertical axis about 180 degrees relative to the second battery module. In various examples, the positive terminal of the second battery module and the negative terminal of the third battery module may be electrically coupled to one another.

At operation 708, the process may include inserting a fourth battery module into the casing of the battery pack via a fourth pair of rails, wherein a negative terminal of the fourth battery module is located at the first end of the casing. To align the positive terminal of the third battery module and the negative terminal of the fourth battery module, the fourth battery module may be rotated about a vertical axis about 180 degrees relative to the third battery module. In various examples, the positive terminal of the third battery module and the negative terminal of the fourth battery module may be electrically coupled to one another.

At operation 710, the process may include inserting a fifth battery module into the casing of the battery pack via a fifth pair of rails, wherein a positive terminal of the fifth battery module is located at the first end of the casing. To align the negative terminal of the fourth battery module and the positive terminal of the fifth battery module, the fifth battery module may be rotated about a vertical axis about 180 degrees relative to the fourth battery module. In various examples, the positive terminal of the fourth battery module and the negative terminal of the fifth battery module may be electrically coupled to one another.

At operation 712, the process may include inserting a sixth battery module into the casing of the battery pack via a sixth pair of rails, wherein a negative terminal of the sixth battery module is located at the first end of the casing. To align the positive terminal of the fifth battery module and the negative terminal of the sixth battery module, the sixth battery module may be rotated about a vertical axis about 180 degrees relative to the fifth battery module. In various examples, the positive terminal of the fifth battery module and the negative terminal of the sixth battery module may be electrically coupled to one another.

At operation 714, the process may include mechanically securing the first, second, third, fourth, fifth, and sixth battery modules to the respective pairs of rails with one or more fasteners. The fasteners may include any kind of mechanical fasteners (e.g., screws, bolts, pins, snap connectors, latches, spring-type fasteners, etc.) that may be releasably attached to the battery module, the rails, and/or the casing of the battery pack. In some examples, the battery modules may be mechanically coupled to the rails by securing a plate to an end of a rail and a side wall of the battery modules proximate the end of the rails. In at least one example, the plate may be coupled to the end of the rail via two fasteners and coupled to the battery module via two fasteners.

FIG. 8 depicts an example process 800 for coupling battery modules, such as battery module 104, of a battery pack, such as battery pack 102, to one another.

At operation 802, the process may include coupling a positive terminal associated with a first battery module to a negative terminal associated with a second battery module. In various examples, the positive terminal associated with the first battery module may be disposed substantially above the negative terminal associated with the second battery module.

At operation 804, the process may include coupling a positive terminal associated with the second battery module to a negative terminal associated with a third battery module. In various examples, the positive terminal associated with the second battery module may be disposed substantially above the negative terminal associated with the third battery module.

At operation 806, the process may include coupling a positive terminal associated with the third battery module to a negative terminal associated with a fourth battery module. In various examples, the positive terminal associated with the third battery module may be disposed substantially above the negative terminal associated with the fourth battery module.

At operation 808, the process may include coupling a positive terminal associated with the fourth battery module to a negative terminal associated with a fifth battery module. In various examples, the positive terminal associated with the fourth battery module may be disposed substantially above and offset from the negative terminal associated with the second battery module.

At operation 810, the process may include coupling a positive terminal associated with the fifth battery module to a negative terminal associated with a sixth battery module. In various examples, the positive terminal associated with the fifth battery module may be disposed substantially above and offset from the negative terminal associated with the sixth battery module. In various examples, the couplings between the battery modules may include electrical couplings via bus bars or wires.

At operation 812, the process may include coupling a positive terminal associated with the sixth battery module to a high voltage junction box via a first positive bus bar and a negative terminal associated with the first battery module to the high voltage junction box via a first negative bus bar. The first positive bus bar and the first negative bus bar may, via the high voltage junction box, provide power to a drive module to operate one or more components of a vehicle associated therewith.

EXAMPLE CLAUSES

A: An electrical system configured to supply electric power to an electric load of a vehicle, the electrical system comprising: a casing comprising: a first set of rails coupled to a first interior surface of the casing; and a second set of rails coupled to a second interior surface of the casing and spaced from the first set of rails; a first battery module comprising a first housing mechanically coupled to the first set of rails; and a second battery module comprising a second housing mechanically coupled to the second set of rails, the second housing separated a distance from the first housing, the distance defining a gap between the first battery module and the second battery module to thermally insulate the second battery module from the first battery module.

B: The electrical system as paragraph A describes, wherein at least one of the first set of rails or the second set of rails comprises a coating configured to restrict gases from traveling between the gap and another gap.

C: The electrical system as either of paragraphs A or B describe, wherein the first set of rails and the second set of rails extend substantially a length of the interior surface of the casing to restrict gases from traveling from an area proximate the first battery module to an area proximate the second battery module.

D: The electrical system as any of paragraphs A-C describe, further comprising an insulating material disposed between cells of at least one of the first battery module or the second battery module.

E: The electrical system as any of paragraphs A-D describe, wherein the casing further comprises a vent in a side of the casing disposed between the first set of rails and the second set of rails to vent pressurized gas from the gap.

F: The electrical system as any of paragraphs A-E describe, wherein the housing of at least one of the first battery module or the second battery module comprises: a cover; and an insulating material covering at least a portion of the cover.

G: A battery pack comprising: a casing comprising a casing attachment mechanism disposed on an interior surface of the casing; and a battery module comprising a module attachment mechanism mechanically coupled to the casing attachment mechanism, wherein at least one of the casing attachment mechanism or the module attachment mechanism supports the battery module with a gap on at least one side of the battery module.

H: The battery pack as paragraph G describes, wherein the module attachment mechanism is complimentary in shape to the casing attachment mechanism, such that the module attachment mechanism one of receives or is received by the casing attachment mechanism.

I: The battery pack as either of paragraphs G or H describe, wherein the casing attachment mechanism comprises at least one of a rail or a coupler and wherein the module attachment mechanism comprises the other of the rail or the coupler.

J: The battery pack as any of paragraphs G-I describe, wherein at least one of the casing attachment mechanism or the module attachment mechanism extends substantially a length of the interior surface of the casing to restrict gas from traveling from an area proximate the first battery module to an area proximate a second battery module.

K: The battery pack as any of paragraphs G-J describe, wherein at least one of the casing attachment mechanism or the module attachment mechanism comprises a coating to at least one of: increase a frictional component between the casing attachment mechanism and the module attachment mechanism; or restrict gases from traveling between the casing attachment mechanism and the module attachment mechanism.

L: The battery pack as any of paragraphs G-K describe, wherein the battery module comprises: a plurality of cells arranged with space between adjacent cells of the plurality of cells; and an insulating material disposed in the space between adjacent cells of the plurality of cells.

M: The battery pack as any of paragraphs G-L describe, wherein the casing further comprises a vent in a side of the casing to selectively vent pressurized gas generated by the battery module.

N: The battery pack as any of paragraphs G-M describe, wherein the battery module comprises: a cover; and a thermally insulating material coupled to at least a portion of the cover.

O: The battery pack as any of paragraphs G-N describe, further comprising a second battery module configured to couple to a second casing attachment mechanism, the second battery module separated from the first battery module by a distance, the distance defining the gap and substantially insulating the second battery module from the first battery module.

P: A casing comprising: a base; a tope; and a first side wall, a second side wall, a third side wall and a fourth side wall, wherein the first side wall and the second side wall have disposed on an interior surface thereof, a first pair of casing attachment mechanisms and a second pair of casing attachment mechanisms, the first pair of casing attachment mechanisms being configured to couple to a first battery module and the second pair of casing attachment mechanisms being configured to couple to a second battery module, wherein couplings between at least the first pair of casing attachment mechanisms and the first battery module restrict gas from traveling between the first pair of casing attachment mechanisms and the first battery module.

Q: A casing as paragraph P describes, wherein at least one of the first pair of casing attachment mechanisms or the second pair of casing attachment mechanisms comprises at least one of a rail or a coupler.

R: A casing as either of paragraphs P or Q describe, further comprising a vent configured to vent gas from an interior compartment of the casing to an environment exterior to the casing.

S: A casing as paragraph R describes, wherein the vent is configured to release pressure within the interior compartment responsive to a pressure exceeding a threshold pressure.

T: A casing as any of paragraphs P-S describe, wherein a first frequency associated with the casing with the first battery module and the second battery module inserted is at least a threshold amount above a second frequency associated with at least one component of a vehicle associated with the casing.

U: An electrical system configured to supply electric power to an electric load of a vehicle, the electrical system comprising: a casing; at least two battery housings coupled to the casing, a first battery housing configured with a positive terminal proximate to a first corner on a first side and a negative terminal proximate to a second corner on a second side, the second corner being diagonally opposite the first corner; a first positive bus bar connecting the at least two battery housings to a high voltage junction box; a first negative bus bar connecting the at least two battery housings to the high voltage junction box; a second positive bus bar coupled to the high voltage junction box; a second negative bus bar coupled to the high voltage junction box; and a connector coupled to the second positive bus bar and the second negative bus bar, the connector configured to route power from the high voltage junction box to an external load.

V: An electrical system as paragraph U describes, wherein the high voltage junction box is configured to de-energize at least one of the second positive bus bar or the second negative bus bar in the event of at least one of a thermal runaway, a short, over-temperature, under-temperature, a vehicle electronic control unit failure, a crash event, or an over-voltage of a battery housing of the at least two battery housings.

W: An electrical system as either of paragraphs U or V describe, wherein the first positive bus bar and the second positive bus bar are configured to provide power from the at least two battery housings to a load configured to drive the vehicle via the high voltage junction box.

X: An electrical system as any of paragraphs U-W describe, wherein the positive terminal is spaced a distance from the negative terminal to prevent electrical arcing between the positive terminal and the negative terminal.

Y: An electrical system as any of paragraphs U-X describe, wherein the at least two battery modules are connected to one another in series.

Z: An electrical system as any of paragraphs U-Y describe, wherein the first connector is further configured to route power to the high voltage junction box from the external load via the second positive bus bar and the second negative bus bar.

AA: A battery pack comprising: a casing; at least two batteries coupled to the casing, a battery of the at least two batteries configured with a positive terminal proximate to a first corner on a first side and a negative terminal proximate to a second corner on a second side, the second corner being diagonally opposite the first corner; a positive bus bar connecting a positive terminal associated with the at least two batteries to a junction box; and a negative bus bar connecting a negative terminal associated with the at least two batteries to the junction box, wherein the positive bus bar and the negative bus bar are configured to transmit power from the at least two batteries to a vehicle system via the junction box.

AB: A battery pack as paragraph AA describes, wherein the positive terminal is spaced a distance from the negative terminal to prevent electrical arcing between the positive terminal and the negative terminal.

AC: A battery pack as either of paragraphs AA or AB describe, further comprising: a second positive bus bar coupled to the junction box at a first end of the second positive bus bar; a second negative bus bar coupled to the junction box at a first end of the second negative bus bar; and a connector coupled to a second end of the second positive bus bar and the second negative bus bar, the connector configured to route power to an external load.

AD: A battery pack as paragraph AC describes, wherein the connector is further configured to route power to the junction box from the external load via the second positive bus bar and the second negative bus bar.

AE: A battery pack as paragraph AC describes, wherein the junction box is configured to de-energize at least one of the second positive bus bar or the second negative bus bar in the event of at least one of a thermal runaway, a short, over-temperature, under-temperature, a vehicle electronic control unit failure, a crash event, or an over-voltage of the at least two batteries.

AF: A battery pack as any of paragraphs AA-AE describe, wherein the positive terminal comprises a most positive terminal associated with the at least two batteries and the negative terminal comprises a most negative terminal associated with the at least two batteries.

AG: A battery pack as any of paragraphs AA-AF describe, a first battery of the at least two batteries comprises a first positive terminal disposed proximate a first corner of the battery pack and a first negative terminal disposed proximate a second corner of the battery pack; and a second battery of the at least two batteries configured with a second positive terminal disposed proximate the second corner of the battery pack and a second negative terminal disposed proximate the first corner of the battery pack, wherein the first positive terminal is coupled to the second negative terminal.

AH: A battery pack as any of paragraphs AA-AG describe, wherein the at least two batteries are connected to one another in series.

AI: A battery pack comprising: a casing; at least two battery subsystems coupled to the casing; a positive bus bar connecting a positive terminal associated with the at least two battery subsystems modules to a junction box; a negative bus bar connecting a negative terminal associated with the at least two battery subsystems to the junction box; a second positive bus bar connecting the junction box to a connector; and a second negative bus bar connecting the junction box to the connector.

AJ: A battery pack as paragraph AI describes, wherein a battery subsystem of the at least two battery subsystems is configured with a positive terminal proximate to a first corner on a first side and a negative terminal proximate to a second corner on a second side, the second corner being diagonally opposite the first corner.

AK: A battery pack as paragraph AJ describes, wherein the positive terminal is spaced a distance from the negative terminal to prevent electrical arcing between the positive terminal and the negative terminal.

AL: A battery pack as any of paragraphs AI-AK describe, wherein a battery subsystem of the at least two battery subsystems comprises a plurality of electrical cells.

AM: A battery pack as any of paragraphs AI-AL describe, wherein the at least two battery subsystems comprise: a first battery comprising a first positive terminal and a first negative terminal; a second battery comprising a second positive terminal and a second negative terminal, wherein the second negative terminal is coupled to the first positive terminal; a third battery comprising a third positive terminal and a third negative terminal, wherein the third negative terminal is coupled to the second positive terminal; a fourth battery comprising a fourth positive terminal and a fourth negative terminal, wherein the fourth negative terminal is coupled to the third positive terminal; a fifth battery comprising a fifth positive terminal and a fifth negative terminal, wherein the fifth negative terminal is coupled to the fourth positive terminal; and a sixth battery comprising a sixth positive terminal and a sixth negative terminal, wherein the sixth negative terminal is coupled to the fifth positive terminal.

AN: A battery pack as paragraph AM describes, wherein the negative bus bar is coupled to the first negative terminal, the first negative terminal comprising a most negative terminal of the battery pack, and wherein the positive bus bar is coupled to the sixth positive terminal, the sixth positive terminal comprising a most positive terminal of the battery pack.

AO: A method comprising: inserting a first battery module into a casing of a battery pack via a first pair of rails, wherein a positive terminal of the first battery module is located at a first end of the casing; inserting a second battery module into the casing of the battery pack via a second pair of rails, wherein a negative terminal of the second battery module is located at the first end of the casing; inserting a third battery module into the casing of the battery pack via a third pair of rails, wherein a positive terminal of the third battery module is located at the first end of the casing; inserting a fourth battery module into the casing of the battery pack via a fourth pair of rails, wherein a negative terminal of the fourth battery module is located at the first end of the casing; inserting a fifth battery module into the casing of the battery pack via a fifth pair of rails, wherein a positive terminal of the fifth battery module is located at the first end of the casing; inserting a sixth battery module into the casing of the battery pack via a sixth pair of rails, wherein a negative terminal of the sixth battery module is located at the first end of the casing; an mechanically securing the first, second, third, fourth, fifth, and six battery modules to the respective pairs of rails with one or more fasteners.

AP: A method comprising: inserting a first battery module into a casing of a battery pack via a first pair of rails, wherein a positive terminal of the first battery module is located at a first end of the casing; inserting a second battery module into the casing of the battery pack via a second pair of rails, wherein a negative terminal of the second battery module is located at the first end of the casing; and mechanically securing the first battery module to the first pair of rails and the second battery module to the second pair of rails with one or more fasteners.

AQ: A method comprising: coupling a positive terminal associated with a first battery module to a negative terminal associated with a second battery module; coupling a positive terminal associated with the second battery module to a negative terminal associated with a third battery module; coupling a positive terminal associated with the third battery module to a negative terminal associated with a fourth battery module; coupling a positive terminal associated with the fourth battery module to a negative terminal associated with a fifth battery module; coupling a positive terminal associated with the fifth battery module to a negative terminal associated with a sixth battery module; and coupling a positive terminal associated with the sixth battery module to a drive module via a first positive bus bar and a negative terminal associated with the first battery to the drive module via a first negative bus bar.

AR: A method comprising: coupling a positive terminal associated with a first battery module to a negative terminal associated with a second battery module; and coupling a positive terminal associated with the second battery module to a drive module via a first positive bus bar and a negative terminal associated with the first battery to the drive module via a first negative bus bar.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A casing comprising:
   a first side wall and a second side wall, wherein the first side wall and the second side wall have disposed on an interior surface thereof, a first pair of casing attachment mechanisms, the first pair of casing attachment mechanisms being configured to couple to a first battery module, wherein couplings between at least the first pair of casing attachment mechanisms and the first battery module comprises a barrier configured to restrict gas from traveling across the first pair of casing attachment mechanisms.

2. The casing of claim 1, wherein the first pair of casing attachment mechanisms comprises at least one of a rail or a coupler.

3. The casing of claim 1, wherein the first pair of casing attachment mechanisms extend substantially a length of the interior surface of the first side wall and the second side wall, respectively.

4. The casing of claim 1, wherein the first side wall and the second side wall have disposed on the interior surface thereof a second pair of casing attachment mechanisms, and the first pair of casing attachment mechanisms and the second pair of casing attachment mechanisms are vertically offset from one another.

5. The casing of claim 4, wherein the first pair of casing attachment mechanisms relative to the second pair of casing attachment mechanisms are configured such that a vertical offset increases at least one of a torsional stiffness or a lateral stiffness of the casing.

6. The casing of claim 1, further comprising a vent configured to transmit gas from an interior compartment of the casing to an environment exterior to the casing.

7. The casing of claim 6, wherein the vent is configured to release pressure within the interior compartment responsive to a pressure exceeding a threshold pressure.

8. The casing of claim 1, wherein a first mechanical frequency associated with the casing with the first battery module inserted is at least a threshold amount above a second mechanical frequency associated with at least one component of a vehicle associated with the casing.

9. A casing comprising:
   a wall having disposed on an interior surface thereof, a casing attachment mechanism configured to couple to a first battery module, wherein coupling between the casing attachment mechanism and the first battery module comprises a barrier configured to restrict gas from traveling across the casing attachment mechanism.

10. The casing of claim 9, wherein the casing attachment mechanism comprises at least one of a rail or a coupler.

11. The casing of claim 9, wherein the casing attachment mechanism extends substantially a length of the interior surface of the wall.

12. The casing of claim 9, wherein the barrier is further configured to increase a frictional component between the casing attachment mechanism and the first battery module.

13. The casing of claim 9, wherein the wall further has disposed on the interior surface a second casing attachment mechanism configured to couple to a second battery module, wherein the first battery module and the second battery module, when inserted into the casing, are vertically offset from one another.

14. The casing of claim 13, wherein a distance associated with a vertical offset of the first battery module relative to the second battery module is configured to increase at least one of a torsional stiffness or a lateral stiffness of the casing.

15. The casing of claim 9, wherein the casing further comprises a vent disposed in the wall to selectively release pressurized gas generated by the first battery module.

16. The casing of claim 9, wherein a first mechanical frequency associated with the casing with the first battery module inserted is at least a threshold amount above a second mechanical frequency associated with at least one component of a vehicle associated with the casing.

17. The casing of claim 9, wherein a first stiffness value of the casing with the first battery module inserted is at least a threshold amount above a second stiffness value associated with a body of a vehicle associated with the casing.

18. The casing of claim 9, wherein the casing comprises at least one of:
- a metal material;
- a ceramic material;
- a plastic material; or
- a composite material.

19. A vehicle comprising:
- a vehicle body; and
- a casing disposed in the vehicle body, the casing comprising:
- a wall having disposed on an interior surface thereof, a casing attachment mechanism configured to couple to a first battery module, wherein coupling between the casing attachment mechanism and the first battery module comprises a barrier configured to restrict gas from traveling across the casing attachment mechanism.

20. The vehicle of claim 19, wherein at least one of:
- a first mechanical frequency of the casing with the first battery module inserted differs from a second mechanical frequency associated with the vehicle body by at least a first threshold amount; or
- or first stiffness value of the casing with the first battery module inserted differs from a second stiffness value associated with the vehicle body by at least a second threshold amount.

* * * * *